(12) United States Patent
Zhu

(10) Patent No.: US 12,349,124 B2
(45) Date of Patent: Jul. 1, 2025

(54) DATA SCHEDULING METHOD AND APPARATUS, AND DATA TRANSMISSION METHOD AND APPARATUS

(71) Applicant: BEIJING XIAOMI MOBILE SOFTWARE CO., LTD., Beijing (CN)

(72) Inventor: Yajun Zhu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 507 days.

(21) Appl. No.: 17/415,426

(22) PCT Filed: Dec. 19, 2018

(86) PCT No.: PCT/CN2018/122044
§ 371 (c)(1),
(2) Date: Jun. 17, 2021

(87) PCT Pub. No.: WO2020/124425
PCT Pub. Date: Jun. 25, 2020

(65) Prior Publication Data
US 2022/0070893 A1 Mar. 3, 2022

(51) Int. Cl.
*H04W 72/1268* (2023.01)
*H04B 7/12* (2006.01)
(Continued)

(52) U.S. Cl.
CPC .......... *H04W 72/1268* (2013.01); *H04B 7/12* (2013.01); *H04L 1/1864* (2013.01);
(Continued)

(58) Field of Classification Search
CPC . H04W 72/1268; H04W 16/14; H04W 76/11; H04W 72/23; H04B 7/12; H04L 1/1864; H04L 1/1893; H04L 5/0091
See application file for complete search history.

(56) References Cited

U.S. PATENT DOCUMENTS 10,701,564 B2 * 6/2020 Xu ................ H04W 72/0453
2010/0074343 A1 3/2010 Gaal et al.
(Continued)

FOREIGN PATENT DOCUMENTS

CN 104620610 A 5/2015
CN 105072690 A 11/2015
(Continued)

OTHER PUBLICATIONS

ZTE, "Considerations on PDCP duplication and data split for NR-U", Nov. 12-16, 2018 found at https://www.3gpp.org/dynareport?code=TDocExMtg--R2-104--18808.htm (Year: 2018).*
(Continued)

*Primary Examiner* — Michael J Moore, Jr.
(74) *Attorney, Agent, or Firm* — Syncoda LLC; Feng Ma

(57) ABSTRACT

A data scheduling method can be applied to a base station and include: sending a scheduling instruction to a terminal, wherein the scheduling instruction is used for indicating whether the terminal transmits the same data packet on a plurality of frequency-domain resources of an unlicensed frequency band; and if the scheduling instruction indicates that the terminal transmits the same data packet on the plurality of frequency-domain resources, receiving the data packet transmitted by the terminal on at least one frequency-domain resource from among the plurality of frequency-domain resources.

19 Claims, 17 Drawing Sheets

| Send a scheduling instruction to a terminal, where the scheduling instruction is used for indicating to the terminal whether to transmit a same data packet on a plurality of frequency-domain resources of an unlicensed frequency band | S21 |

| If the scheduling instruction indicates to the terminal to transmit the same data packet on the plurality of frequency-domain resources, receive the data packet transmitted by the terminal on at least one frequency-domain resource among the plurality of frequency-domain resources | S22 |

| Detect at least one frequency-domain resource among the plurality of frequency-domain resources to determine an idle frequency-domain resource among the plurality of frequency-domain resources | S231 |

| Transmit the data packet on at least one of the idle frequency-domain resource | S232 |

(51) Int. Cl.
  *H04L 1/1829* (2023.01)
  *H04L 1/1867* (2023.01)
  *H04W 16/14* (2009.01)
  *H04L 5/00* (2006.01)
  *H04W 72/23* (2023.01)
  *H04W 76/11* (2018.01)

(52) U.S. Cl.
  CPC ........... *H04L 1/1893* (2013.01); *H04W 16/14* (2013.01); *H04L 5/0091* (2013.01); *H04W 72/23* (2023.01); *H04W 76/11* (2018.02)

(56) References Cited

U.S. PATENT DOCUMENTS

| | | | |
|---|---|---|---|
| 2015/0263773 A1 | 9/2015 | Suzuki et al. | |
| 2017/0048828 A1* | 2/2017 | Um | H04L 1/0061 |
| 2017/0171855 A1* | 6/2017 | Sundararajan | H04B 7/0456 |
| 2018/0035459 A1 | 2/2018 | Islam et al. | |
| 2019/0045458 A1* | 2/2019 | Harada | H04W 72/54 |
| 2019/0182826 A1* | 6/2019 | Yerramalli | H04L 5/0094 |
| 2019/0230630 A1* | 7/2019 | Mu | H04W 72/0466 |
| 2019/0281621 A1* | 9/2019 | Noh | H04L 5/0094 |
| 2019/0305836 A1* | 10/2019 | Kapetanovic | H04B 7/0617 |
| 2020/0170032 A1* | 5/2020 | Li | H04W 72/1268 |
| 2020/0229222 A1* | 7/2020 | Jiang | H04W 16/14 |
| 2021/0120630 A1* | 4/2021 | Zhang | H04W 72/23 |
| 2021/0211230 A1* | 7/2021 | Wu | H04L 1/0041 |
| 2022/0070893 A1* | 3/2022 | Zhu | H04B 7/12 |
| 2022/0116963 A1* | 4/2022 | Zhu | H04W 28/22 |

FOREIGN PATENT DOCUMENTS

| | | | |
|---|---|---|---|
| CN | 108347779 A | 7/2018 | |
| CN | 108631971 A | 10/2018 | |
| CN | 109039530 A | 12/2018 | |
| EP | 3407662 A4 * | 5/2019 | ............... H04L 5/00 |
| WO | 2018219011 A1 | 12/2018 | |

OTHER PUBLICATIONS

CN first office action in application No. 201880003022.X, mailed on Sep. 2, 2022.
CN second office action in application No. 201880003022.X, mailed on May 31, 2023.

* cited by examiner

DATA SCHEDULING METHOD AND APPARATUS, AND DATA TRANSMISSION METHOD AND APPARATUS

CROSS-REFERENCE TO RELATED APPLICATION

This application is a U.S. national stage of International Application No. PCT/CN2018/122044 filed on Dec. 19, 2018, the disclosure of which is hereby incorporated by reference in its entirety.

TECHNICAL FIELD

The present disclosure relates to the field of communication technology, and more particularly, to a data scheduling method, a data transmission method, a data scheduling apparatus, a data transmission apparatus, an electronic device and a computer-readable storage medium.

BACKGROUND

In order to expand a communication frequency band of a terminal, an license Assisted Access (LAA) mechanism is proposed in 3GPP to use an unlicensed frequency band. The bandwidth of the unlicensed frequency band carrier is up to about 20 MHz, while in 5G New Radio (NR), the bandwidth of the carrier may reach 100 MHz. In this case, one carrier may be divided into a plurality of frequency-domain resources.

However, for the plurality of frequency-domain resources on the unlicensed frequency band, the terminal cannot determine whether a scheduled frequency-domain resource can pass a channel detection. Then, when the terminal performs an uplink transmission, a frequency-domain resource impossible to complete the transmission may be selected to perform the uplink transmission, thereby causing failure of the uplink transmission.

SUMMARY

From above, the present disclosure provides a data scheduling method, a data transmission method, a data scheduling apparatus, a data transmission apparatus, an electronic device and a computer-readable storage medium.

According to a first aspect of embodiments of the present disclosure, there is provided a data scheduling method, being applicable to a base station, where the method includes:
  sending a scheduling instruction to a terminal, where the scheduling instruction is used for indicating to the terminal whether to transmit a same data packet on a plurality of frequency-domain resources of an unlicensed frequency band; and
  if the scheduling instruction indicates to the terminal to transmit the same data packet on the plurality of frequency-domain resources, receiving the data packet transmitted by the terminal on at least one frequency-domain resource among the plurality of frequency-domain resources.

Optionally, the scheduling instruction includes first identifiers of the plurality of frequency-domain resources, and the first identifier is used for indicating to the terminal whether to transmit the same data packet on the plurality of frequency-domain resources of the unlicensed frequency band, where the first identifiers are set in different information fields of the scheduling instruction.

Optionally, the scheduling instruction includes first identifiers of the plurality of frequency-domain resources, and the first identifier is used for indicating to the terminal whether to transmit the same data packet on the plurality of frequency-domain resources of the unlicensed frequency band, where the first identifiers are set in a same information field of the scheduling instruction.

Optionally, the scheduling instruction indicates to the terminal whether to transmit the same data packet on the plurality of frequency-domain resources of the unlicensed frequency band through a radio network temporary identity.

Optionally, the scheduling instruction indicates to the terminal whether to transmit the same data packet on the plurality of frequency-domain resources of the unlicensed frequency band through a scrambling sequence of a cyclic redundancy check.

Optionally, the scheduling instruction indicates to the terminal whether to transmit the same data packet on the plurality of frequency-domain resources of the unlicensed frequency band through a format of the scheduling instruction.

Optionally, the scheduling instruction includes a plurality of sub-scheduling instructions, and each of the sub-scheduling instructions is used for indicating to the terminal whether to transmit the same data packet on each of the frequency-domain resources; and
  where if each of the sub-scheduling instructions indicates the terminal to transmit the same data packet on each of the frequency-domain resources, the data packet transmitted by the terminal on at least one frequency-domain resource among the plurality of frequency-domain resources is received.

Optionally, the frequency-domain resource includes at least one of:
  a carrier, a bandwidth part in a same carrier, bandwidth parts in different carriers.

According to a second aspect of embodiments of the present disclosure, there is provided a data transmission method, being applicable to a terminal, where the method includes:
  receiving a scheduling instruction sent by a base station;
  determining whether to transmit a same data packet on a plurality of frequency-domain resources of an unlicensed frequency band according to the scheduling instruction; and
  when transmitting the same data packet on the plurality of frequency-domain resources of the unlicensed frequency band, transmitting the data packet on at least one frequency-domain resource among the plurality of frequency-domain resources.

Optionally, the transmitting the data packet on the at least one frequency-domain resource among the plurality of frequency-domain resources includes:
  detecting at least one frequency-domain resource among the plurality of frequency-domain resources to determine idle frequency-domain resources among the plurality of frequency-domain resources; and
  transmitting the data packet on at least one of the idle frequency-domain resources.

Optionally, the transmitting the data packet on the at least one of the idle frequency-domain resources includes:
  determining a starting time-domain resource corresponding to a respective frequency-domain resource of the at least one of the idle frequency-domain resources; and
  transmitting the data packet on at least one of the idle frequency-domain resources according to a relationship of a respective of the starting time-domain resource.

Optionally, the transmitting the data packet on the at least one of the idle frequency-domain resources according to the relationship of the respective of the starting time-domain resource includes:
  transmitting the data packet on the idle frequency-domain resource corresponding to an earliest starting time-domain resource.

Optionally, the transmitting the data packet on the at least one of the idle frequency-domain resources includes:
  determining a sequence number corresponding to a respective frequency-domain resource of the at least one of the idle frequency-domain resources; and
  transmitting the data packet on at least one of the idle frequency-domain resources according to a relationship of a respective of the sequence number.

Optionally, the transmitting the data packet on the at least one of the idle frequency-domain resources according to the relationship of the respective of the sequence number includes:
  transmitting the data packet on the idle frequency-domain resource corresponding to a sequence number arranged at a preset position.

Optionally, the scheduling instruction includes a first identifier corresponding to the data packet, and the determining whether to transmit the same data packet on the plurality of frequency-domain resources of the unlicensed frequency band according to the scheduling instruction includes:
  determining whether the first identifier is identical to a target identifier; and
  where when the first identifier is identical to the target identifier, it is determined to transmit the same data packet on the plurality of frequency-domain resources of the unlicensed frequency band.

Optionally, the scheduling instruction includes a plurality of sub-scheduling instructions, where the sub-scheduling instruction includes a first identifier corresponding to the data packet, and the determining whether to transmit the same data packet on the plurality of frequency-domain resources of the unlicensed frequency band according to the scheduling instruction includes:
  determining whether the first identifiers which are included in respective of the sub-scheduling instructions and are corresponding to the data packet are identical; and
  where when the first identifiers which are included in the respective of the sub-scheduling instructions and are corresponding to the data packet are identical, it is determined to transmit the same data packet on the plurality of frequency-domain resources of the unlicensed frequency band.

Optionally, the scheduling instruction includes a radio network temporary identity, and the determining whether to transmit the same data packet on the plurality of frequency-domain resources of the unlicensed frequency band according to the scheduling instruction includes:
  determining whether the radio network temporary identity is identical to a target radio network temporary identity; and
  where when the radio network temporary identity is identical to the target radio network temporary identity, it is determined to transmit the same data packet on the plurality of frequency-domain resources of the unlicensed frequency band.

Optionally, the scheduling instruction includes a plurality of sub-scheduling instructions, where the sub-scheduling instruction includes a radio network temporary identity, and the determining whether to transmit the same data packet on the plurality of frequency-domain resources of the unlicensed frequency band according to the scheduling instruction includes:
  determining whether the radio network temporary identities included in respective of the sub-scheduling instructions are identical; and
  where when the radio network temporary identities included in the respective of the sub-scheduling instructions are identical, it is determined that the same data packet needs to be transmitted.

Optionally, a scrambling sequence of a cyclic redundancy check of the scheduling instruction corresponds to the data, and the determining whether to transmit the same data packet on the plurality of frequency-domain resources of the unlicensed frequency band according to the scheduling instruction includes:
  determining whether the scrambling sequence of the cyclic redundancy check of the scheduling instruction is identical to a target sequence; and
  where when the scrambling sequence of the cyclic redundancy check of the scheduling instruction is identical to the target sequence, it is determined to transmit the same data packet on the plurality of frequency-domain resources of the unlicensed frequency band.

Optionally, the scheduling instruction includes a plurality of sub-scheduling instructions, and a scrambling sequence of a cyclic redundancy check of the sub-scheduling instruction corresponds to the data, where the determining whether the data packets need to be transmitted are identical according to the plurality of the sub-scheduling instructions includes:
  determining whether the scrambling sequences of the cyclic redundancy checks of respective of the sub-scheduling instructions are identical; and
  where when the scrambling sequences of the cyclic redundancy checks of the respective of the sub-scheduling instructions are identical, it is determined that the same data packet needs to be transmitted.

Optionally, a format of the scheduling instruction corresponds to the data, and the determining whether to transmit the same data packet on the plurality of frequency-domain resources of the unlicensed frequency band according to the scheduling instruction includes:
  determining whether the format of the scheduling instruction is identical to a target format; and
  where when the format of the scheduling instruction is identical to the target format, it is determined to transmit the same data packet on the plurality of frequency-domain resources of the unlicensed frequency band.

Optionally, the scheduling instruction includes a plurality of sub-scheduling instructions, and a format of the sub-scheduling instruction corresponds to the data, where the determining whether the data packets need to be transmitted are identical according to the plurality of the sub-scheduling instructions includes:
  determining whether the formats of respective of the sub-scheduling instructions are identical; and
  where when the formats of the respective of the sub-scheduling instructions are identical, it is determined that the same data packet needs to be transmitted.

Optionally, the frequency-domain resource includes at least one of:
  a carrier, a bandwidth part in a same carrier, bandwidth parts in different carriers.

According to a third aspect of embodiments of the present disclosure, there is provided a data scheduling apparatus, being applicable to a base station, where the apparatus includes:

an instruction sending module, configured to send a scheduling instruction to a terminal, where the scheduling instruction is used for indicating to the terminal whether to transmit a same data packet on a plurality of frequency-domain resources of an unlicensed frequency band; and a data receiving module, configured to receive the data packet transmitted by the terminal on at least one frequency-domain resource among the plurality of frequency-domain resources in the case that the scheduling instruction indicates to the terminal to transmit the same data packet on the plurality of frequency-domain resources.

Optionally, the scheduling instruction includes first identifiers of the plurality of frequency-domain resources, and the first identifier is used for indicating to the terminal whether to transmit the same data packet on the plurality of frequency-domain resources of the unlicensed frequency band, where the first identifiers are set in different information fields of the scheduling instruction.

Optionally, the scheduling instruction includes first identifiers of the plurality of frequency-domain resources, and the first identifier is used for indicating to the terminal whether to transmit the same data packet on the plurality of frequency-domain resources of the unlicensed frequency band, where the first identifiers are set in a same information field of the scheduling instruction.

Optionally, the scheduling instruction indicates to the terminal whether to transmit the same data packet on the plurality of frequency-domain resources of the unlicensed frequency band through a radio network temporary identity.

Optionally, the scheduling instruction indicates to the terminal whether to transmit the same data packet on the plurality of frequency-domain resources of the unlicensed frequency band through a scrambling sequence of a cyclic redundancy check.

Optionally, the scheduling instruction indicates to the terminal whether to transmit the same data packet on the plurality of frequency-domain resources of the unlicensed frequency band through a format of the scheduling instruction.

Optionally, the scheduling instruction includes a plurality of sub-scheduling instructions, and each of the sub-scheduling instructions is used for indicating to the terminal whether to transmit the same data packet on each of the frequency-domain resources; and where the data receiving module is configured to receive the data packet transmitted by the terminal on at least one frequency-domain resource among the plurality of frequency-domain resources in the case that each of the sub-scheduling instructions indicates to the terminal to transmit the same data packet on each of the frequency-domain resources.

Optionally, the frequency-domain resource includes at least one of:

a carrier, a bandwidth part in a same carrier, bandwidth parts in different carriers.

According to a fourth aspect of embodiments of the present disclosure, there is provided a data transmission apparatus, being applicable to a terminal, where the apparatus includes:

an instruction receiving module, configured to receive a scheduling instruction sent by a base station;

a transmission determination module, configured to determine whether to transmit a same data packet on a plurality of frequency-domain resources of an unlicensed frequency band according to the scheduling instruction; and a data transmission module, configured to transmit the data packet on at least one frequency-domain resource among the plurality of frequency-domain resources in the case that the same data packet is transmitted on the plurality of frequency-domain resources of the unlicensed frequency band.

Optionally, the data transmission module includes:

an idle detection submodule, configured to detect at least one frequency-domain resource among the plurality of frequency-domain resources to determine idle frequency-domain resources among the plurality of frequency-domain resources; and a first transmission submodule, configured to transmit the data packet on at least one of the idle frequency-domain resources.

Optionally, the data transmission module includes:

a resource determination unit, configured to determine a starting time-domain resource corresponding to a respective of the frequency-domain resource of the at least one of the idle frequency-domain resources; and a second transmission submodule, configured to transmit the data packet on at least one of the idle frequency-domain resources according to a relationship of respective of the starting time-domain resource.

Optionally, the second transmission submodule is configured to transmit the data packet on the idle frequency-domain resource corresponding to an earliest starting time-domain resource.

Optionally, the data transmission module includes:

an identifier determination submodule, configured to determine a sequence number corresponding to a respective of the frequency-domain resource of the at least one of the idle frequency-domain resources; and a third transmission submodule, configured to transmit the data packet on at least one of the idle frequency-domain resources according to a relationship of respective of the sequence number.

Optionally, the third transmission submodule is configured to transmit the data packet on the idle frequency-domain resource corresponding to a sequence number arranged at a preset position.

Optionally, the scheduling instruction includes a first identifier corresponding to the data packet, and the transmission determination module is configured to determine whether the first identifier is identical to a target identifier; and where when the first identifier is identical to the target identifier, it is determined to transmit the same data packet on the plurality of frequency-domain resources of the unlicensed frequency band.

Optionally, the scheduling instruction includes a plurality of sub-scheduling instructions, where the sub-scheduling instruction includes a first identifier corresponding to the data packet, and the transmission determination module is configured to determine whether the first identifiers which are included in respective of the sub-scheduling instructions and are corresponding to the data packet are identical; and where when the first identifiers which are included in the respective of the sub-scheduling instructions and are corresponding to the data packet are identical, it is determined to transmit the same data packet on the plurality of frequency-domain resources of the unlicensed frequency band.

Optionally, the scheduling instruction includes a radio network temporary identity, and the transmission determination module is configured to, determine whether the radio network temporary identity is identical to a target radio network temporary identity; and where when the radio network temporary identity is identical to the target radio network temporary identity, it is determined to transmit the same data packet on the plurality of frequency-domain resources of the unlicensed frequency band.

Optionally, the scheduling instruction includes a plurality of sub-scheduling instructions, where the sub-scheduling instruction includes a radio network temporary identity, and the transmission determination module is configured to determine whether the radio network temporary identities included in respective of the sub-scheduling instructions are identical; and where when the radio network temporary identities included in the respective of the sub-scheduling instructions are identical, it is determined that the same data packet needs to be transmitted.

Optionally, a scrambling sequence of a cyclic redundancy check of the scheduling instruction corresponds to the data, and the transmission determination module is configured to determine whether the scrambling sequence of the cyclic redundancy check of the scheduling instruction is identical to a target sequence; and where when the scrambling sequence of the cyclic redundancy check of the scheduling instruction is identical to the target sequence, it is determined to transmit the same data packet on the plurality of frequency-domain resources of the unlicensed frequency band.

Optionally, the scheduling instruction includes a plurality of sub-scheduling instructions, and a scrambling sequence of a cyclic redundancy check of the sub-scheduling instruction corresponds to the data, where the transmission determination module is configured to determine whether the scrambling sequences of the cyclic redundancy checks of respective of the sub-scheduling instructions are identical; and where when the scrambling sequences of the cyclic redundancy checks of the respective of the sub-scheduling instructions are identical, it is determined that the same data packet needs to be transmitted.

Optionally, a format of the scheduling instruction corresponds to the data, and the transmission determination module is configured to determine whether the format of the scheduling instruction is identical to a target format; and where when the format of the scheduling instruction is identical to the target format, it is determined to transmit the same data packet on the plurality of frequency-domain resources of the unlicensed frequency band.

Optionally, the scheduling instruction includes a plurality of sub-scheduling instructions, and a format of the sub-scheduling instruction corresponds to the data, where the transmission determination module is configured to determine whether the formats of respective of the sub-scheduling instructions are identical; and where when the formats of the respective of the sub-scheduling instructions are identical, it is determined that the same data packet needs to be transmitted.

Optionally, the frequency-domain resource includes at least one of:

a carrier, a bandwidth part in a same carrier, bandwidth parts in different carriers.

According to a fifth aspect of embodiments of the present disclosure, there is provided an electronic device, including:

a processor; and a memory for storing instructions executable by the processor;

where the processor is configured to execute the steps in the data scheduling method and/or in the data transmission method described by any of the foregoing embodiments.

According to a sixth aspect of embodiments of the present disclosure, there is provided a computer-readable storage medium having stored therein a computer program that, when executed by a processor, implements the steps in the data scheduling method and/or in the data transmission method described by any of the foregoing embodiments.

According to the embodiments of the present disclosure, the base station may send the scheduling instruction to the terminal, and indicate to the terminal whether to transmit the same data packet on the plurality of frequency-domain resources of the unlicensed frequency band through the scheduling instruction. If the scheduling instruction indicates to the terminal to transmit the same data packet on the plurality of frequency-domain resources, then the terminal may determine on which frequency-domain resource it is suitable to transmit the data packet. Thus, the terminal can transmit the data packet on at least one frequency-domain resource among these frequency-domain resources, so as to ensure that the data packet transmitted can be received by the base station, and further ensure successful communication between the base station and the terminal.

BRIEF DESCRIPTION OF THE DRAWINGS

In order to more clearly illustrate the technical solutions in the embodiments of the present disclosure, the accompanying drawings which need to be used in the description of the embodiments will be introduced below briefly. Obviously, the accompanying drawings in below description are merely some embodiments of the present disclosure. To those of ordinary skilled in the art, other drawing may be obtained according to these accompanying drawings without creative work.

DETAILED DESCRIPTION

The technical solution in the embodiments of the present disclosure will be clearly and completely described below in conjunction with the accompanying drawings in the embodiments of the present disclosure. Obviously, the embodiments described are merely a part of the embodiments of the present disclosure, rather than all the embodiments. Based on the embodiments in the present disclosure, all other embodiments obtained by those of ordinary skilled in the art without creative work fall within the protection scope of the present disclosure.

Figure 1:
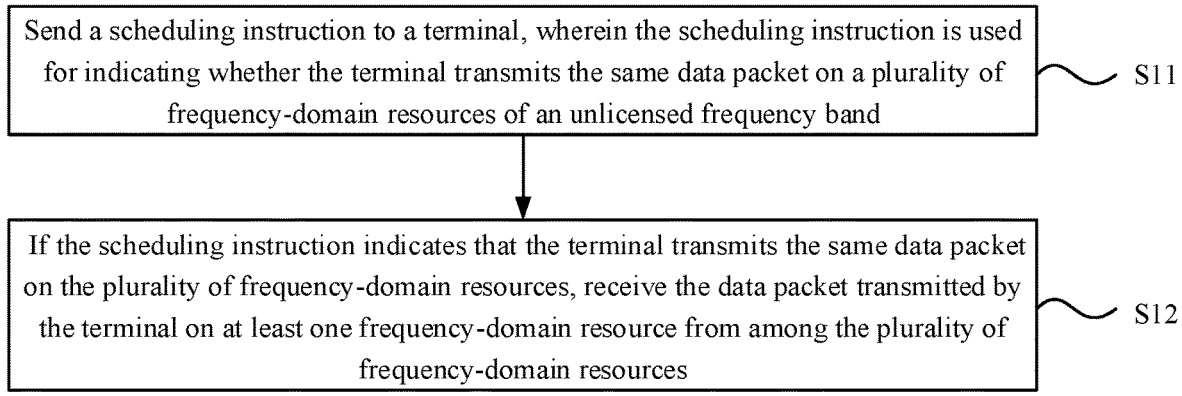
FIG. 1 is a schematic flow chart showing a data scheduling method, according to an embodiment of the present disclosure.

FIG. 1 is a schematic flow chart showing a data scheduling method, according to an embodiment of the present disclosure. The method described by the present embodiment is applicable to a base station, where the base station may communicate with a terminal serving as user equipment, and the terminal includes an electronic device such as a mobile phone, a tablet computer, a wearable device, and the like. The base station and the terminal may communicate based on 5G NR.

As shown in FIG. 1, the data scheduling method may include the following steps.

In step S11, a scheduling instruction is sent to a terminal, where the scheduling instruction is used for indicating to the terminal whether to transmit a same data packet on a plurality of frequency-domain resources of an unlicensed frequency band.

In step S12, if the scheduling instruction indicates to the terminal to transmit the same data packet on the plurality of frequency-domain resources, the data packet transmitted by the terminal on at least one frequency-domain resource among the plurality of frequency-domain resources is received.

In one embodiment, the terminal may be configured with a plurality of frequency-domain resources on the unlicensed frequency band. The plurality of frequency-domain resources may refer to a plurality of carriers, or a plurality of bandwidth parts (BWPs) in a same carrier, or different bandwidth parts in different carriers.

The terminal may transmit the data packet to the base station on the plurality of bandwidth parts configured. However, the terminal cannot determine whether the scheduled frequency-domain resource can pass channel detection, which may cause that when the terminal performs an uplink transmission, a selected frequency-domain resource makes the base station fail to receive the data packet transmitted because the channel detection is failed (i.e. the frequency-domain resource is non-idle), thereby causing that the base station fails to communicate with the terminal.

According to the embodiment of the present disclosure, the base station may send the scheduling instruction to the terminal, and indicate whether the terminal transmits the same data packet on the plurality of frequency-domain resources of the unlicensed frequency band through the scheduling instruction. If the scheduling instruction indicates to the terminal to transmit the same data packet on the plurality of frequency-domain resources, then the terminal may determine on which frequency-domain resources it is suitable to transmit the data packet, and thus the data packet may be transmitted on at least one frequency-domain resource among these frequency-domain resources, so as to ensure that the data packet transmitted can be received by the base station, and further ensure successful communication between the base station and the terminal.

It needs to be illustrated that before transmission on a frequency-domain resource in the unlicensed frequency band, the terminal also needs to detect the frequency-domain resource to determine whether the frequency-domain resource is idle, and can transmit the data packet on an idle frequency-domain resource only. If the plurality of frequency-domain resources indicated by the scheduling instruction are all non-idle, then the terminal cannot transmit the data packet to the base station, and the base station cannot receive the data packet sent by the terminal.

The manner of detecting the frequency-domain resource to determine whether the frequency-domain resource is idle, which is involved in the embodiment of the present disclosure, includes, but not limited to, Listen Before Talk (LBT). The embodiments of the present disclosure will be exemplarily illustrated below with LBT being the manner of detecting the frequency-domain resource.

In one embodiment, after detecting whether the plurality of frequency-domain resources indicated by the scheduling instruction are idle, the terminal may send the same data packet to the base station on all of the idle frequency-domain resources. Accordingly, even if an individual frequency-domain resource is impossible to be occupied because of being non-idle, transmission of the data packet may also be completed through other frequency-domain resource, and thus it is ensured to the greatest extent that the data packet is transmitted to the base station successfully.

Optionally, the scheduling instruction includes first identifiers of the plurality of frequency-domain resources, and the first identifier is used for indicating to the terminal whether to transmit the same data packet on the plurality of frequency-domain resources of the unlicensed frequency band, where the first identifiers are set in different information fields of the scheduling instruction.

In one embodiment, the frequency-domain resource may be indicated by the first identifier. The first identifiers may be set in different information fields of the scheduling instruction, and then different frequency-domain resources may correspond to different first identifiers. For example, each of the first identifiers occupies one bit, taking 4 frequency-domain resources as an example, the first identifiers of these 4 frequency-domain resources may be denoted by 4 bits. For example, the 4 bits are 1111, which means that the terminal is indicated to transmit the same data packet on all of the 4 frequency-domain resources. For example, the 4 bits are 0011, which means that the terminal is indicated to transmit the same data packet on the third and fourth frequency-domain resources only.

Optionally, the scheduling instruction includes the first identifiers of the plurality of frequency-domain resources, and the first identifier is used for indicating to the terminal whether to transmit the same data packet on the plurality of frequency-domain resources of the unlicensed frequency band, where the first identifiers are set in same information field of the scheduling instruction.

In one embodiment, the frequency-domain resource may be indicated by the first identifier. The first identifiers may be set in the same information field of the scheduling instruction, and then all of the frequency-domain resources may correspond to different first identifiers. 8 frequency-domain resources are taken as an example, which may be denoted by 3 bits. For example, the 3 bits are 111, which means that the terminal is indicated to transmit the same data packet on all of the 8 frequency-domain resources. For example, the 3 bits are 011, which means that the terminal is indicated to transmit the same data packet on the first 3 frequency-domain resources. For example, the 3 bits are 101, which means that the terminal is indicated to transmit the same data packet on the first 5 frequency-domain resources.

In addition to the foregoing indicating to the terminal whether to transmit the same data packet on the plurality of frequency-domain resources of the unlicensed frequency band in an explicit manner, it may be indicated whether the terminal transmits the same data packet on the plurality of frequency-domain resources of the unlicensed frequency band in an implicit manner. The subsequent embodiments will be referred to.

Optionally, the scheduling instruction indicates to the terminal whether to transmit the same data packet on the plurality of frequency-domain resources of the unlicensed frequency band through a radio network temporary identity.

In one embodiment, the base station may carry the radio network temporary identity (RNTI) in the scheduling instruction sent to the terminal, to indicate through the carried radio network temporary identity that the scheduling instruction is used for scheduling the same data packet to be transmitted on the plurality of frequency resources. The terminal may prestore a target radio network temporary identity, and compares the target radio network temporary identity with the radio network temporary identity in the scheduling instruction. If the two are identical, it is determined that the radio network temporary identity in the scheduling instruction is used for indicating that the terminal transmits the same data packet on the plurality of frequency-domain resources of the unlicensed frequency band. If the two are different, it is determined that the radio network temporary identity in the scheduling instruction is used for indicating that the terminal does not transmit the same data packet on the plurality of frequency-domain resources of the unlicensed frequency band.

In addition to being prestored by the terminal, the target radio network temporary identity may also be sent to the terminal by the base station through a radio resource control (RRC) signalling, a media access control control element (MAC CE) or a physical layer signaling.

Optionally, the scheduling instruction indicates to the terminal whether to transmit the same data packet on the plurality of frequency-domain resources of the unlicensed frequency band through a scrambling sequence of a cyclic redundancy check.

In one embodiment, the base station may also scramble the cyclic redundancy check corresponding to the scheduling instruction, and the terminal may descramble the scrambled content using a corresponding target sequence. The scrambling sequences used for scrambling may be different. Therefore, it may be indicated whether the terminal transmits the same data packet on the plurality of frequency-domain resources of the unlicensed frequency band through using different scrambling sequences.

The terminal may prestore the target sequence, and descrambles the scrambled content through the target sequence. If able to succeed in descrambling, it is determined that the radio network temporary identity in the scheduling instruction is used for indicating that the terminal transmits the same data packet on the plurality of frequency-domain resources of the unlicensed frequency band. If not able to succeed in descrambling, it is determined that the radio network temporary identity in the scheduling instruction is used for indicating that the terminal does not transmit the same data packet on the plurality of frequency-domain resources of the unlicensed frequency band.

In addition to being prestored by the terminal, the target sequence may also be sent to the terminal by the base station through a radio resource control signalling, a media access control control element (MAC CE) or a physical layer signaling.

Optionally, the scheduling instruction indicates to the terminal whether to transmit the same data packet on the plurality of frequency-domain resources of the unlicensed frequency band through a format of the scheduling instruction.

In one embodiment, the base station may send scheduling instructions in different formats, and thus it may be indicated whether the terminal transmits the same data packet on the plurality of frequency-domain resources of the unlicensed frequency band through the format of the scheduling instruction sent.

After receiving the scheduling instruction, the terminal may parse the scheduling instruction according to a target format. If able to succeed in parsing, it may be determined that the format of the scheduling instruction is identical to the target format, then it is determined that the scheduling instruction is used for indicating that the terminal transmits the same data packet on the plurality of frequency-domain resources of the unlicensed frequency band. If not able to succeed in parsing, it may be determined that the format of the scheduling instruction is different from the target format, then it is determined that the scheduling instruction is used for indicating that the terminal does not transmit the same data packet on the plurality of frequency-domain resources of the unlicensed frequency band.

The terminal may prestore information of the target format. In addition to being prestored by the terminal, the information of the target format may also be sent to the terminal by the base station through a radio resource control signalling, a media access control control element (MAC CE) or a physical layer signaling.

Figure 2A:
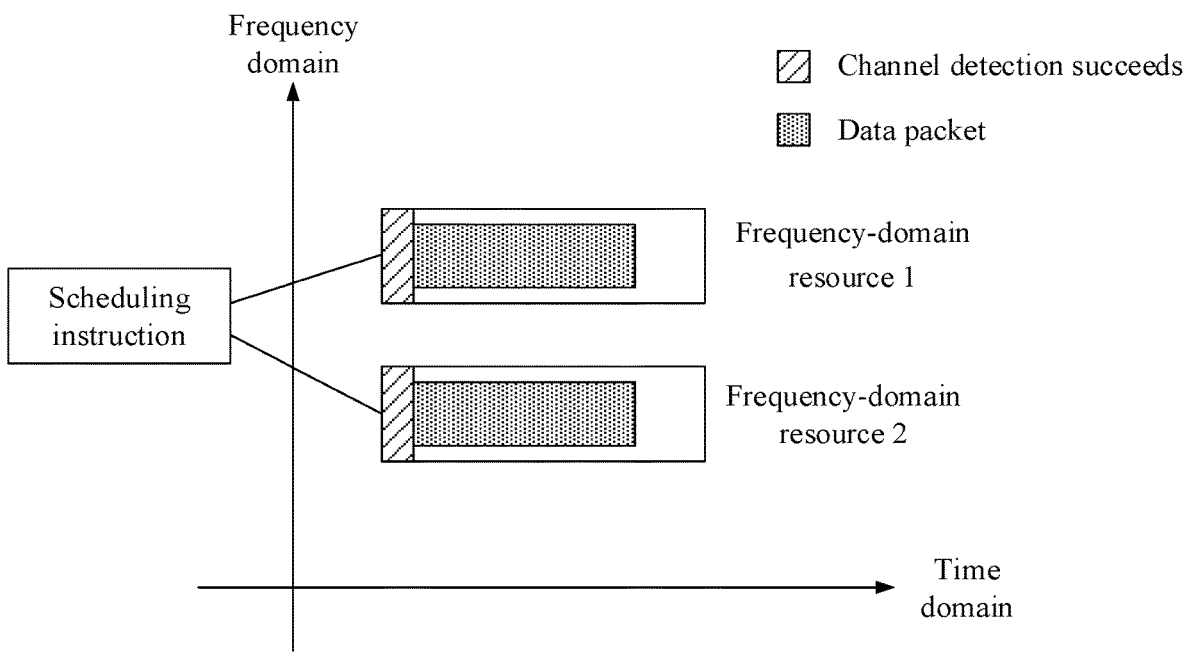
FIG. 2A to FIG. 2C are a type of schematic diagrams illustrating indicating to the terminal whether to transmit the same data packet on the plurality of frequency-domain resources of the unlicensed frequency band through the scheduling instruction, according to embodiments of the present disclosure.
Figure 2B:
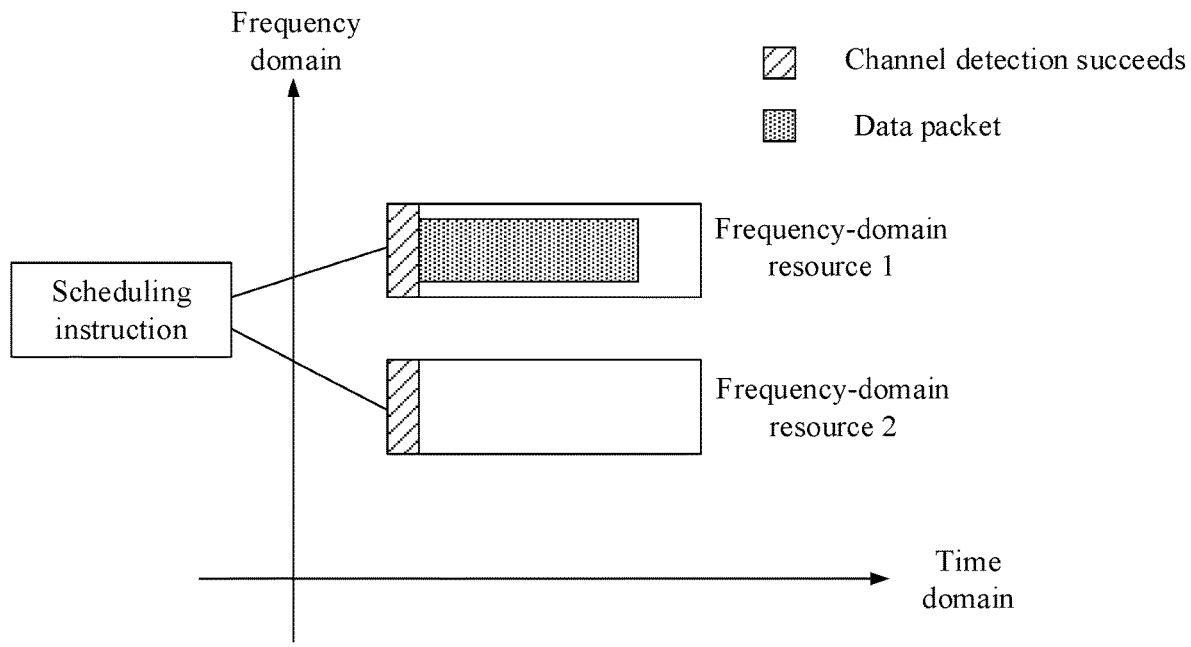
Figure 2C:
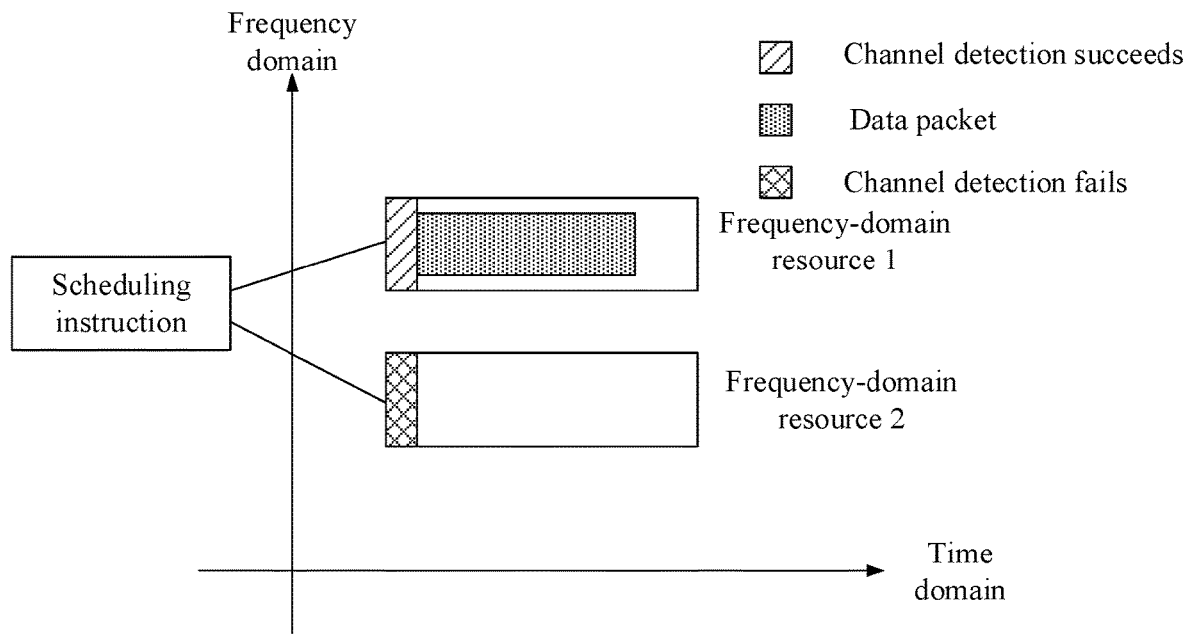

FIG. 2A to FIG. 2C are schematic diagrams illustrating indicating to the terminal whether to transmit the same data packet on the plurality of frequency-domain resources of the unlicensed frequency band through the scheduling instruction, according to embodiments of the present disclosure.

In one embodiment, the scheduling instruction may be one single scheduling instruction, and it is indicated whether the terminal transmits the same data packet on the plurality of frequency-domain resources of the unlicensed frequency band through this scheduling instruction.

As shown in FIG. 2A to FIG. 2C, the base station may indicate to the terminal to transmit the same data packet on two frequency-domain resources (frequency-domain resource 1 and frequency-domain resource 2) of the unlicensed frequency band through the scheduling instruction. After receiving the scheduling instruction, the terminal may first perform LBT on the two frequency-domain resources respectively.

In the case that it is determined that both of the frequency-domain resources are idle, for example, the channel detection through LBT for the frequency-domain resource 1 and the frequency-domain resource 2 is successful, the same data packet may be sent to the base station on the two frequency-domain resources as shown in FIG. 2A, or the same data packet may be sent to the base station on the frequency-domain resource 1 only as shown FIG. 2B.

In the case that one frequency-domain resource of the two frequency-domain resources is non-idle, for example, the channel detection through LBT for the frequency-domain resource 2 is failed, the same data packet may be sent to the base station on the frequency-domain resource 1 only as shown in FIG. 2C.

Figure 3A:
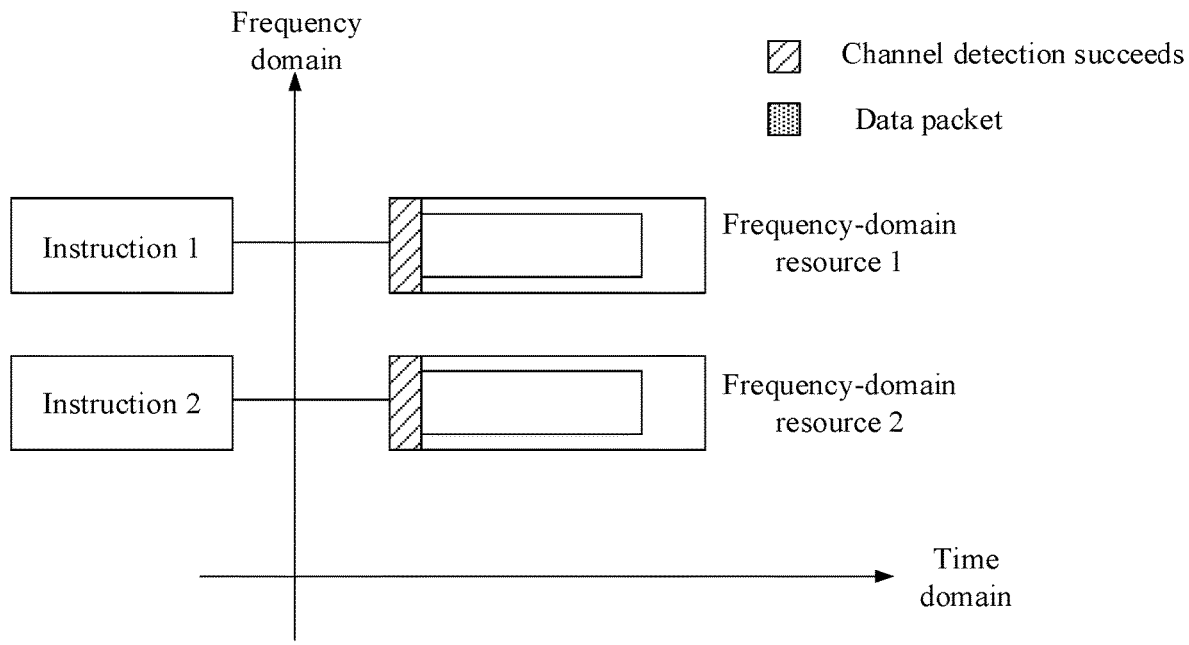
FIG. 3A to FIG. 3F are another type of schematic diagrams illustrating indicating to the terminal whether to transmit the same data packet on the plurality of frequency-domain resources of the unlicensed frequency band through the scheduling instruction, according to embodiments of the present disclosure.
Figure 3B:
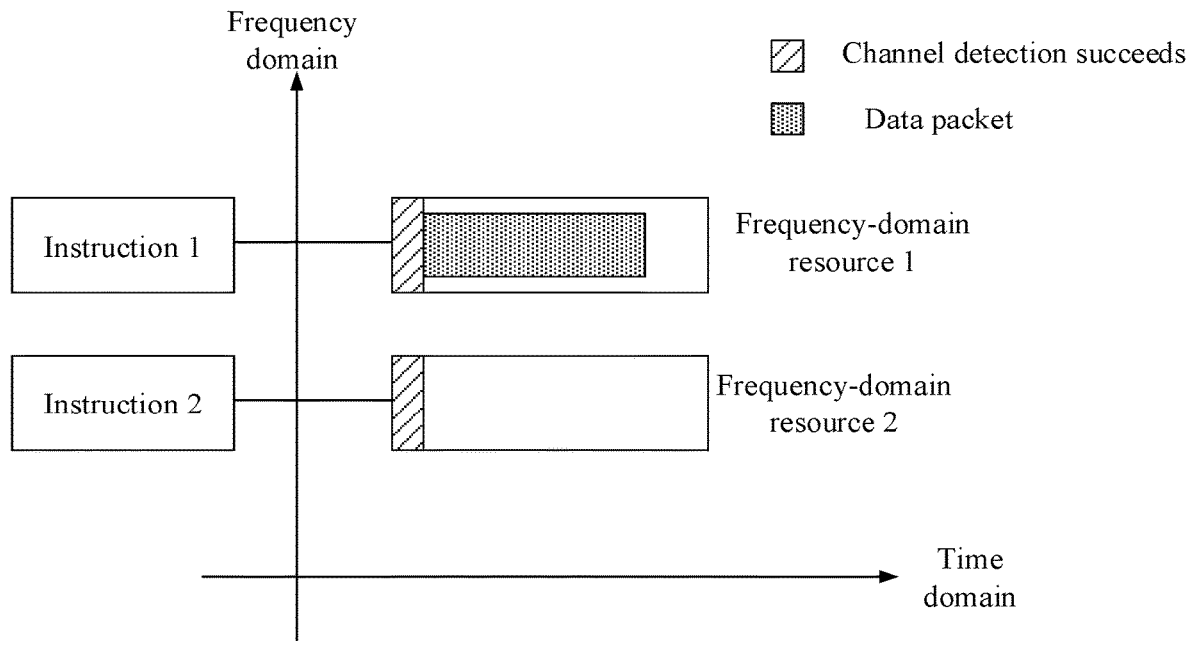
Figure 3C:
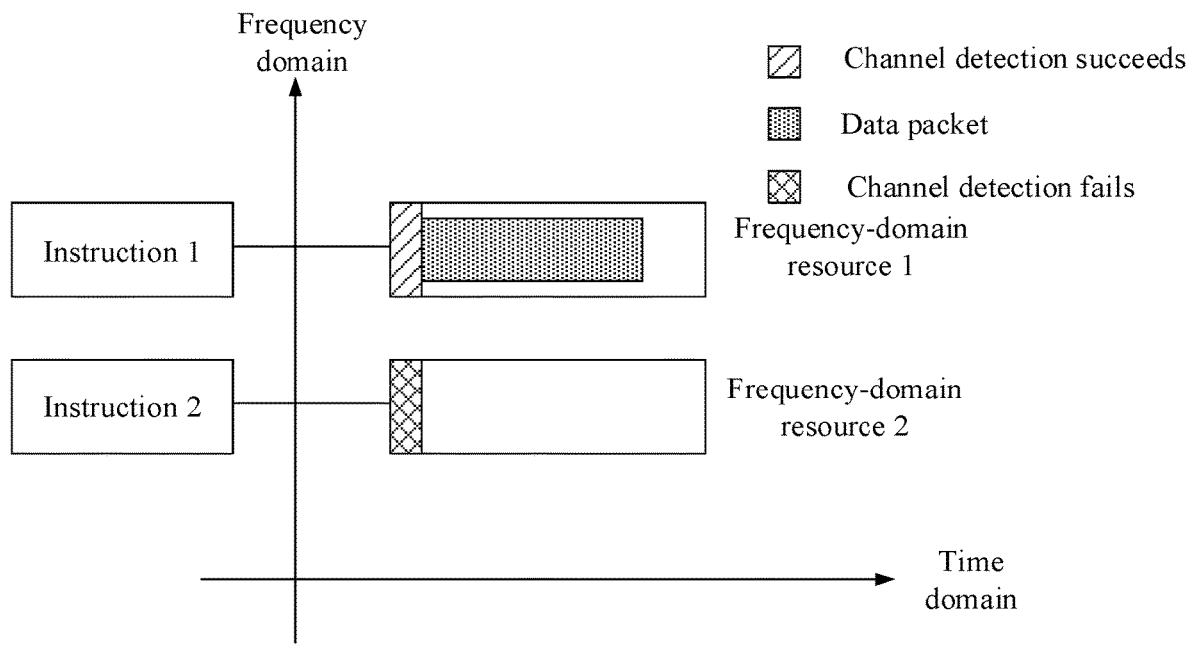

FIG. 3A to FIG. 3C are some other schematic diagrams illustrating indicating to the terminal whether to transmit the same data packet on the plurality of frequency-domain resources of the unlicensed frequency band through the scheduling instruction, according to embodiments of the present disclosure.

Optionally, the scheduling instruction includes a plurality of sub-scheduling instructions, and each of the sub-scheduling instructions is used for indicating to the terminal whether to transmit the same data packet on each of the frequency-domain resources; and where if each of the sub-scheduling instructions indicates to the terminal to transmit the same data packet on each of the frequency-domain resources, the data packet transmitted by the terminal on at least one frequency-domain resource among the plurality of frequency-domain resources is received.

As shown in FIG. 3A to FIG. 3F, the base station may indicate to the terminal to transmit the same data packet on two frequency-domain resources (frequency-domain resource 1 and frequency-domain resource 2) of the unlicensed frequency band through two sub-scheduling instructions (instruction 1 and instruction 2), where the instruction 1 is used for indicating the terminal to transmit the data packet on the frequency-domain resource 1, and the instruction 2 is used for indicating the terminal to transmit the data packet on the frequency-domain resource 2. After receiving the scheduling instruction, the terminal may first perform LBT on the two frequency-domain resources respectively.

In the case that it is determined that both of the two frequency-domain resources are idle, for example, the channel detection through LBT for the frequency-domain resource 1 and the frequency-domain resource 2 is successful, then the same data packet may be sent to the base station on the two frequency-domain resources as shown in FIG. 3A, or the same data packet may be sent to the base station on the frequency-domain resource 1 only as shown in FIG. 3B.

In the case that one frequency-domain resource of the two frequency-domain resources is non-idle, for example, the channel detection through LBT for the frequency-domain resource 2 is failed, then the same data packet may be sent to the base station on the frequency-domain resource 1 only as shown in FIG. 3C.

It needs to be illustrated that the terminal may select one or more frequency-domain resources among the idle frequency-domain resources based on a preset parameter to send the same data packet in the case that it is determined that a plurality of the frequency-domain resources are idle. The preset parameter is the sequence number of the frequency-domain resource, and then the terminal may preferentially select the frequency-domain resource with the smallest sequence number. For example, the preset parameter is the time-domain resource when the frequency-domain resource starts, then the terminal may preferentially select the frequency-domain resource of which a starting time-domain resource is the earliest. For example, the preset parameter is a number of times the frequency-domain resource has been used by the terminal, then the terminal may preferentially select the frequency-domain resource that has been used and has been used the most times.

For example, as shown in FIG. 2B, the data packet is transmitted on the frequency-domain resource with the smaller sequence number between the frequency-domain resource 1 and the frequency-domain resource 2, i.e. the frequency-domain resource 1.

Figure 3D:
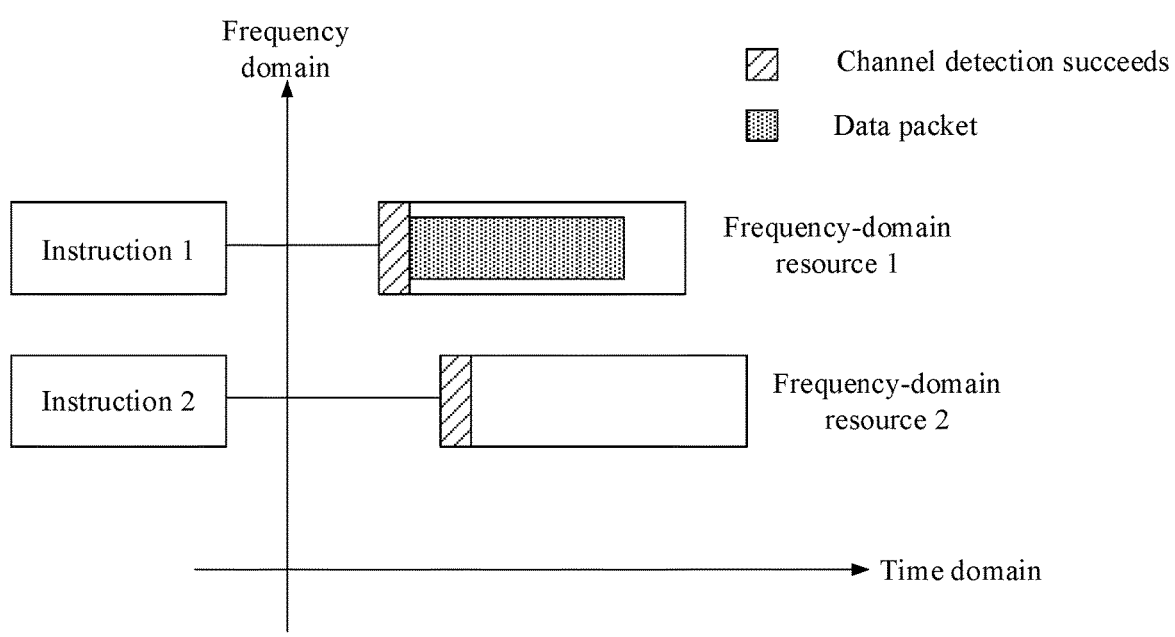

For example, as shown in FIG. 3D, the data packet is transmitted on the frequency-domain resource of which the start time-domain resource is the earliest between the frequency-domain resource 1 and the frequency-domain resource 2, i.e. the frequency-domain resource 1.

Figure 3E:
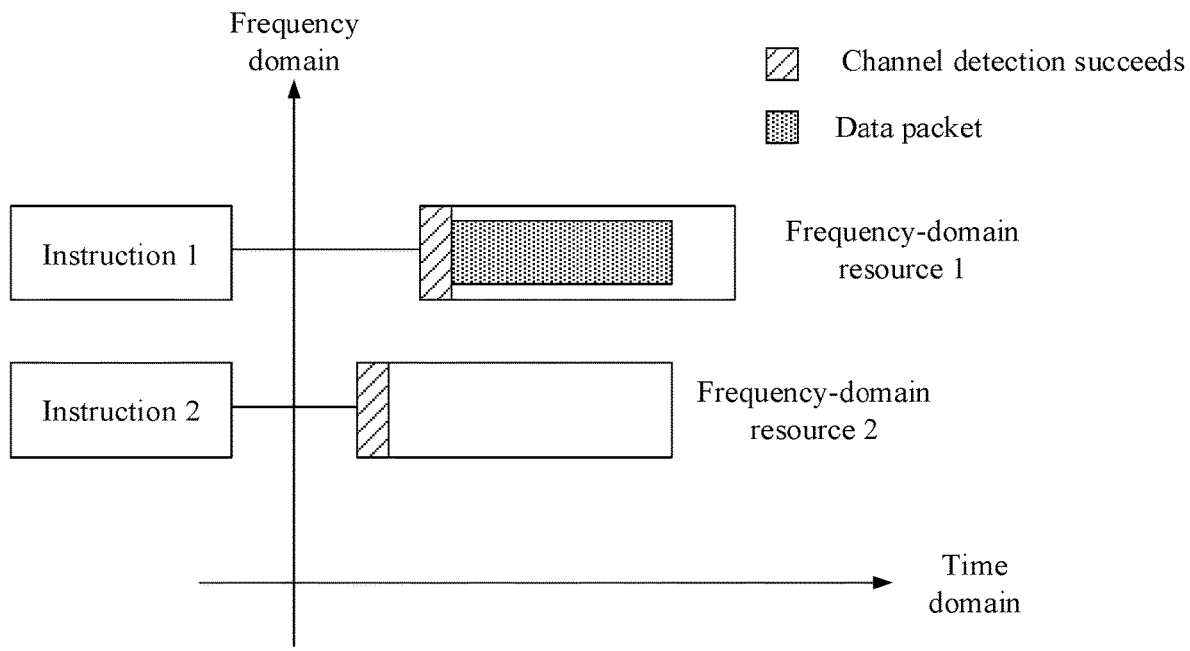

In addition, priorities of different preset parameters may be different. For example, the priority of the sequence number of the frequency-domain resource is higher than the priority of the stating time-domain resource of the frequency-domain resource. Then as shown in FIG. 3E, even if the starting time-domain resource of the frequency-domain resource 2 is earlier than the starting time-domain resource of the frequency-domain resource 1, the sequence number of the frequency-domain resource 1 is smaller than the sequence number of the frequency-domain resource 2, then the frequency-domain resource with a smaller sequence number is preferentially selected, i.e. the data packet is transmitted on the frequency-domain resource 1.

Figure 3F:
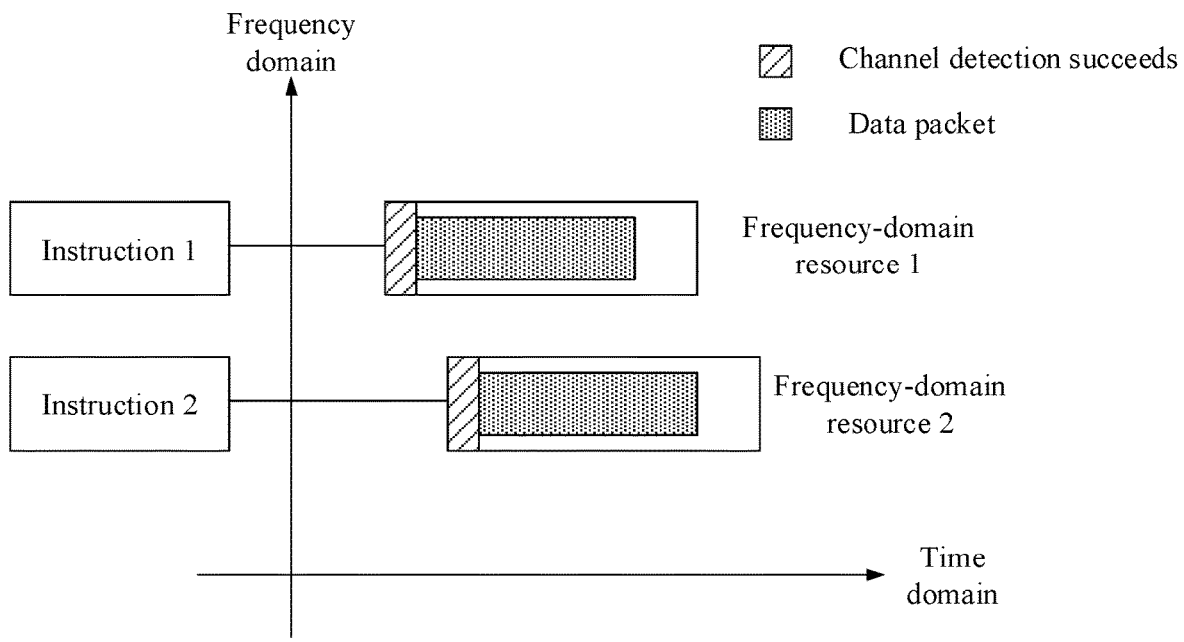

The terminal may also transmit the same data packet on the two frequency-domain resources with different starting time-domain resources as shown in FIG. 3F.

Optionally, the frequency-domain resource includes at least one of:

a carrier, a bandwidth part in a same carrier and bandwidth parts in different carriers.

Figure 4:
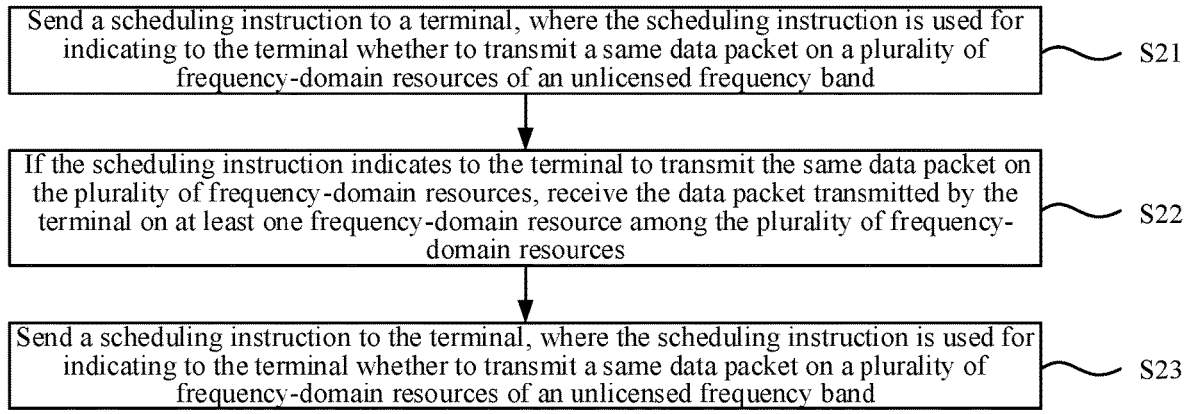
FIG. 4 is a schematic flow chart showing a data transmission method, according to an embodiment of the present disclosure.

FIG. 4 is a schematic flow chart showing a data transmission method, according to an embodiment of the present disclosure. The method described by the present embodiment is applicable to a terminal, where the terminal may communicate with a base station as user equipment, and terminal includes an electronic device such as a mobile phone, a tablet computer, a wearable device, and the like. The base station and the terminal may communicate based on 5G NR.

As shown in FIG. 4, the data transmission method described may include the following step.

In step S21, a scheduling instruction sent by a base station is received.

In step S22, it is determined whether to transmit a same data packet on a plurality of frequency-domain resources of an unlicensed frequency band according to the scheduling instruction.

In step S23, if transmitting the same data packet on the plurality of frequency-domain resources of the unlicensed frequency band, the data packet is transmitted on at least one frequency-domain resource among the plurality of frequency-domain resources.

According to the embodiment of the present disclosure, the base station may send the scheduling instruction to the terminal to indicate whether the terminal transmits the same data packet on the plurality of frequency-domain resources of the unlicensed frequency band through the scheduling instruction. If the scheduling instruction indicates to the terminal to transmit the same data packet on the plurality of frequency-domain resources, then the terminal may determine on which frequency-domain resources it is suitable to transmit the data packet, for example, determine which frequency-domain resources are idle, and thus the data packet may be transmitted on at least one frequency-domain resource among these frequency-domain resources, so as to ensure that the data packet transmitted can be received by the base station, and further ensure successful communication between the base station and the terminal.

Figure 5:
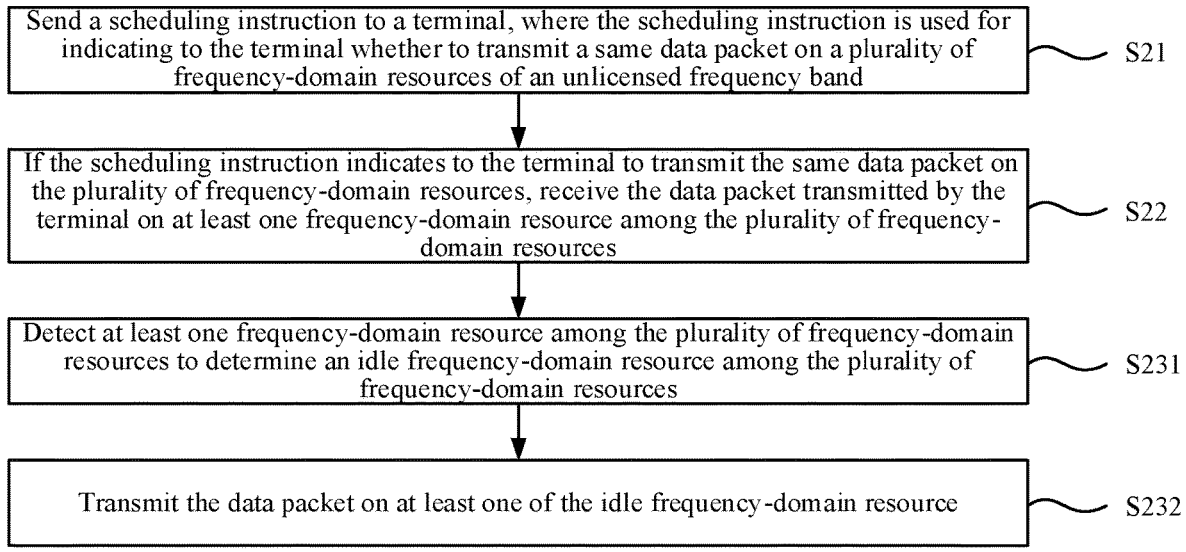
FIG. 5 is a schematic flow chart showing transmitting the data packet on at least one frequency-domain resource among the plurality of frequency-domain resources, according to an embodiment of the present disclosure.

FIG. 5 is a schematic flow chart showing transmitting the data packet on at least one frequency-domain resource among the plurality of frequency-domain resources, according to an embodiment of the present disclosure. As shown in FIG. 5, on the basis of the embodiment shown in FIG. 4, the transmitting the data packet on the at least one frequency-domain resource among the plurality of frequency-domain resources includes the following steps.

In step S231, at least one frequency-domain resource among the plurality of frequency-domain resources is detected to determine idle frequency-domain resources among the plurality of frequency-domain resources.

In step S232, the data packet is transmitted on at least one of the idle frequency-domain resources.

In one embodiment, determining the idle frequency-domain resource through detecting the frequency-domain resource can ensure that subsequent transmission of the data packet can be performed on the idle frequency-domain resource, which is beneficial to ensuring that the base station successfully receives the data packet uploaded by the terminal.

It needs to be illustrated that as to the detection of the plurality frequency-domain resources, the terminal may detect some of the frequency-domain resources only. For example, detection may be performed from small to large according to the sequence numbers of the frequency-domain resources. When it is detected one frequency-domain resource is idle, the subsequent frequency-domain resource may not be detected.

Figure 6:
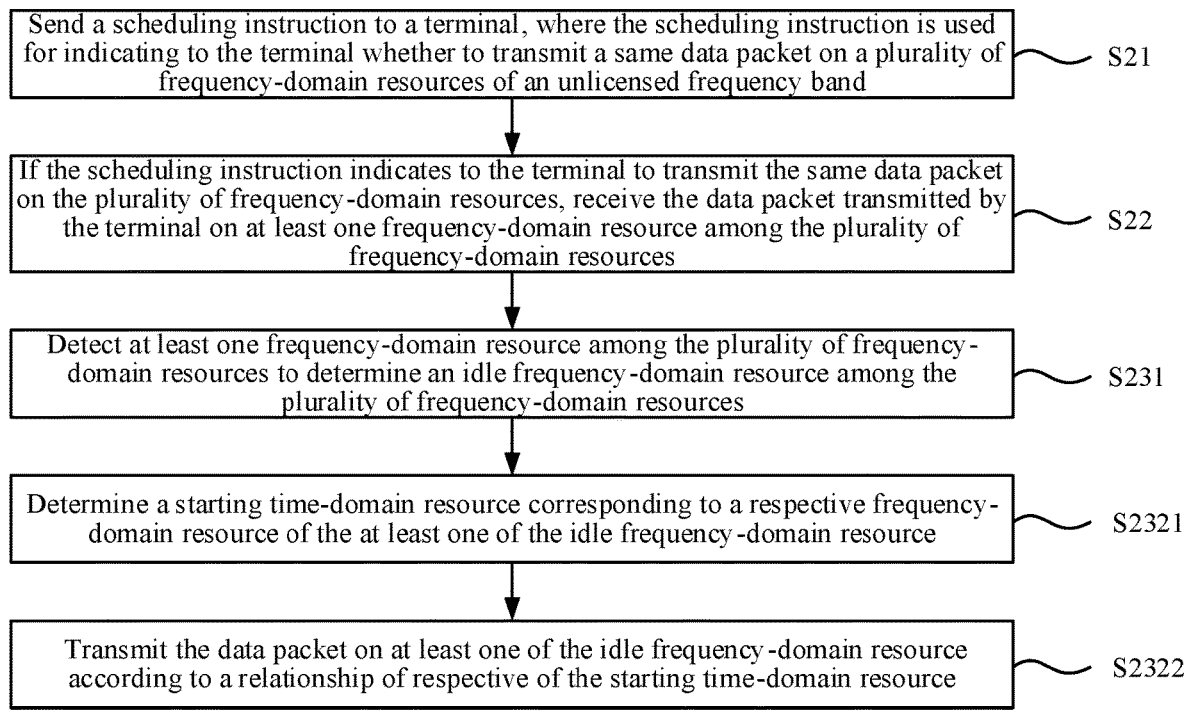
FIG. 6 is a schematic flow chart showing transmitting the data packet on at least one of the idle frequency-domain resources, according to an embodiment of the present disclosure.

FIG. 6 is a schematic flow chart showing transmitting the data packet on at least one of the idle frequency-domain resources, according to an embodiment of the present disclosure. As shown in FIG. 6, on the basis of the embodiment show in FIG. 5, the transmitting the data packet on the at least one of the idle frequency-domain resources includes the following step.

In step S2321, a starting time-domain resource corresponding to a respective frequency-domain resource of the at least one of the idle frequency-domain resources is determined.

In step S2322, the data packet is transmitted on at least one of the idle frequency-domain resources according to a relationship of respective of the starting time-domain resource.

In one embodiment, after determining the at least one of the idle frequency-domain resources, the terminal may determine on which frequency-domain resource to transmit the data packet according to the relationship of the respective of the starting time-domain resource, so as to meet the real-time need of the terminal.

Figure 7:
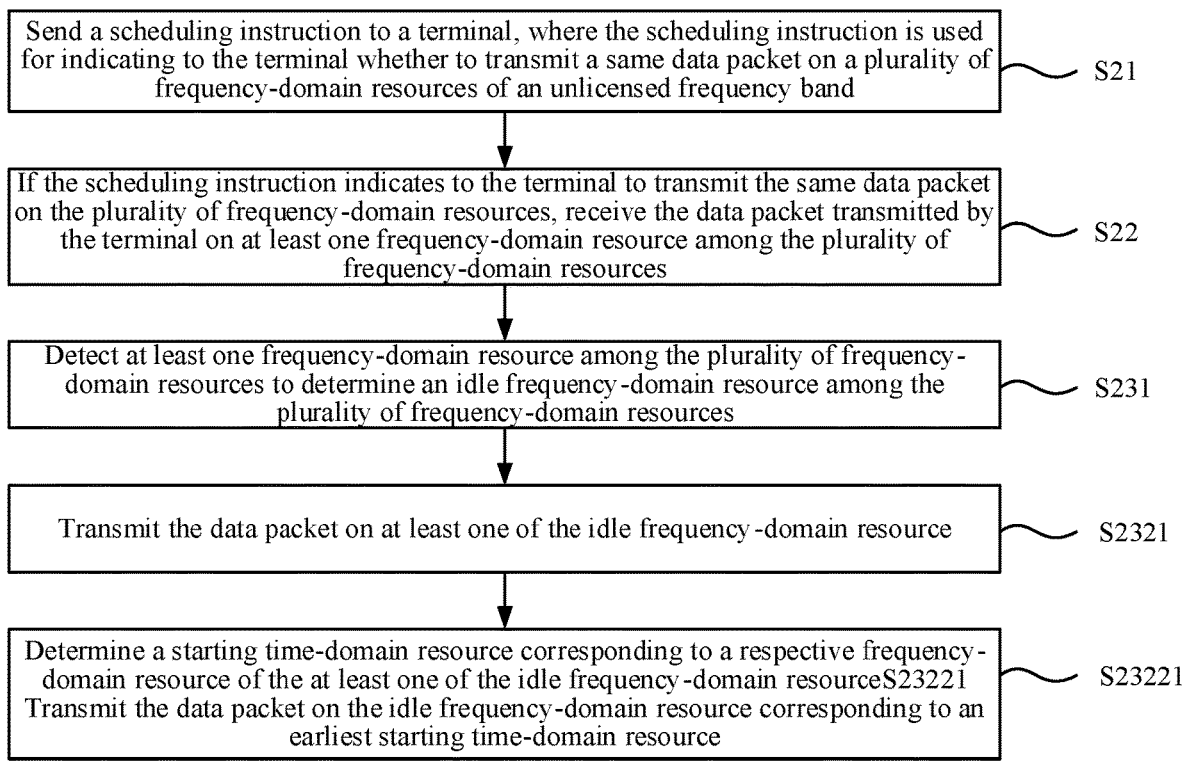
FIG. 7 is a schematic flow chart showing transmitting the data packet on at least one of the idle frequency-domain resources according to the relationship of the starting time-domain resource, according to an embodiment of the present disclosure.

FIG. 7 is a schematic flow chart showing transmitting the data packet on at least one of the idle frequency-domain resources according to the relationship of the starting time-domain resource, according to an embodiment of the present disclosure. As shown in FIG. 7, on the basis of the embodiment shown in FIG. 6, the transmitting the data packet on the at least one of the idle frequency-domain resources according to the relationship of the starting time-domain resource includes the following step.

In step S23221, the data packet is transmitted on the idle frequency-domain resource corresponding to an earliest starting time-domain resource.

In one embodiment, the terminal may transmit the data packet on the idle frequency-domain resource corresponding to the earliest starting time-domain resource, so as to ensure the latency requirement of the service corresponding to the data packet.

Figure 8:
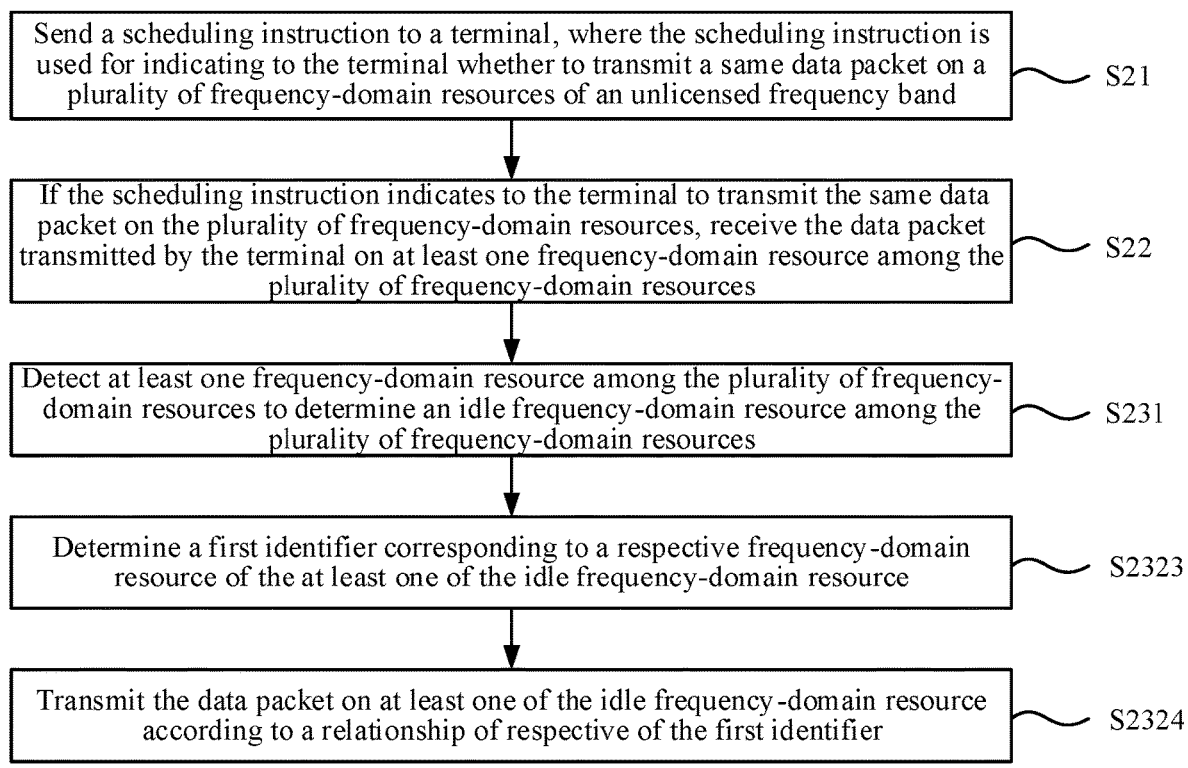
FIG. 8 is another schematic flow chart showing transmitting the data packet on at least one of the idle frequency-domain resources, according to an embodiment of the present disclosure.

FIG. 8 is another schematic flow chart showing transmitting the data packet on at least one of the idle frequency-domain resources, according to an embodiment of the present disclosure. As shown in FIG. 8, on the basis of the embodiment shown in FIG. 5, the transmitting the data packet on the at least one of the idle frequency-domain resources includes the following steps.

In step S2323, a sequence number corresponding to a respective frequency-domain resource of the at least one of the idle frequency-domain resources is determined.

In step S2324, the data packet is transmitted on at least one of the idle frequency-domain resources according to a relationship of a respective of the sequence number.

In one embodiment, after determining the at least one of the idle frequency-domain resources, the terminal may determine on which frequency-domain resource to transmit the data packet according to the relationship of the respective of the sequence number, so as to meet the real-time need of the terminal.

Figure 9:
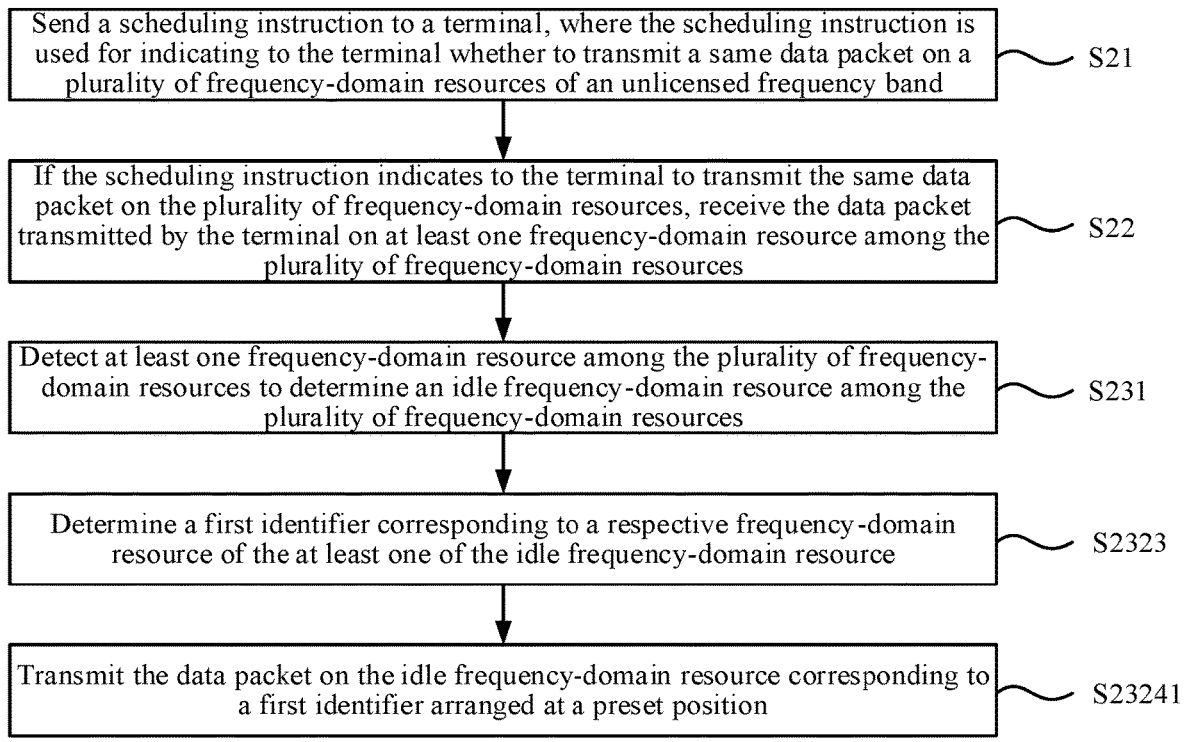
FIG. 9 is a schematic flow chart showing transmitting the data packet on at least one of the idle frequency-domain resources according to the relationship of the respective of the first identifier, according to an embodiment of the present disclosure.

FIG. 9 is a schematic flow chart showing transmitting the data packet on at least one of the idle frequency-domain resources according to the relationship of the respective of the sequence number, according to an embodiment of the present disclosure. As shown in FIG. 9, on the basis of the embodiment shown in FIG. 8, the transmitting the data packet on the at least one of the idle frequency-domain resources according to the relationship of the respective of the sequence number includes the following step.

In step S23241, the data packet is transmitted on the idle frequency-domain resource corresponding to a sequence number arranged at a preset position.

Figure 10:
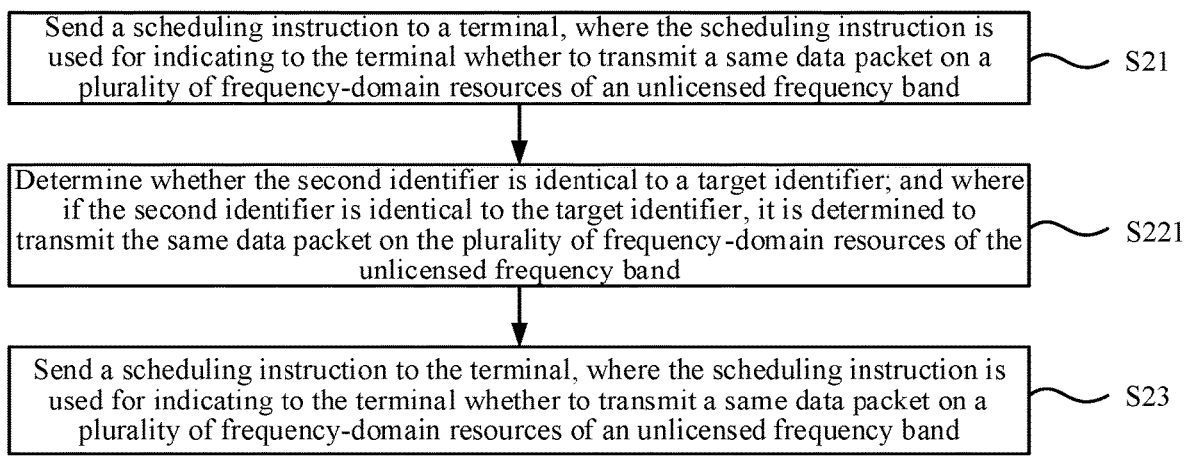
FIG. 10 is a schematic flow chart showing determining whether to transmit the same data packet on the plurality of frequency-domain resources of the unlicensed frequency band according to the scheduling instruction, according to an embodiment of the present disclosure.

FIG. 10 is a schematic flow chart showing determining whether to transmit the same data packet on the plurality of frequency-domain resources of the unlicensed frequency band according to the scheduling instruction, according to an embodiment of the present disclosure. As shown in FIG. 10, on the basis of the embodiment shown in FIG. 4, the scheduling instruction includes a first identifier corresponding to the data packet, and the determining whether to transmit the same data packet on the plurality of frequency-domain resources of the unlicensed frequency band according to the scheduling instruction includes the following step.

In step S221, it is determined whether the first identifier is identical to a target identifier; and
    where if the first identifier is identical to the target identifier, it is determined to transmit the same data packet on the plurality of frequency-domain resources of the unlicensed frequency band.

In one embodiment, in the case that the scheduling instruction is one single scheduling instruction, the scheduling instruction may include the first identifier corresponding to the data packet, and the terminal may compare the first identifier with the target identifier. If it is determined that the first identifier is identical to the target identifier, it is determined to transmit the same data packet on the plurality of frequency-domain resources of the unlicensed frequency band.

Figure 11:
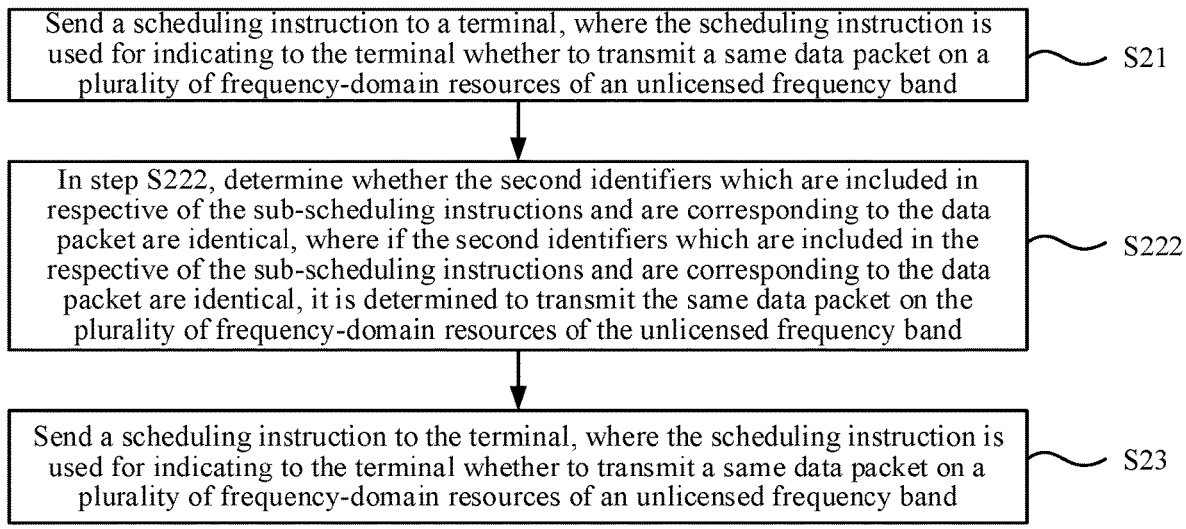
FIG. 11 is another schematic flow chart showing determining whether to transmit the same data packet on the plurality of frequency-domain resources of the unlicensed frequency band according to the scheduling instruction, according to an embodiment of the present disclosure.

FIG. 11 is another schematic flow chart showing determining whether to transmit the same data packet on the plurality of frequency-domain resources of the unlicensed frequency band according to the scheduling instruction, according to an embodiment of the present disclosure. As shown in FIG. 11, on the basis of the embodiment shown in FIG. 4, the scheduling instruction includes a plurality of sub-scheduling instructions, where the sub-scheduling instruction includes the first identifier corresponding to the data packet, and the determining whether to transmit the same data packet on the plurality of frequency-domain resources of the unlicensed frequency band includes the following step.

In step S222, it is determined whether the first identifiers which are included in respective of the sub-scheduling instructions and are corresponding to the data packet are identical;
    where if the first identifiers which are included in the respective of the sub-scheduling instructions and are corresponding to the data packet are identical, it is determined to transmit the same data packet on the plurality of frequency-domain resources of the unlicensed frequency band.

In one embodiment, in the case that the scheduling instruction includes the plurality of the sub-scheduling instructions, the sub-scheduling instruction may include the first identifier corresponding to the data packet, and the terminal may compare the first identifiers which are included in the respective of the sub-scheduling instructions and are corresponding to the data packet. If respective of the first identifiers are identical, it is determined to transmit the same data packet on the plurality of frequency-domain resources of the unlicensed frequency band.

Figure 12:
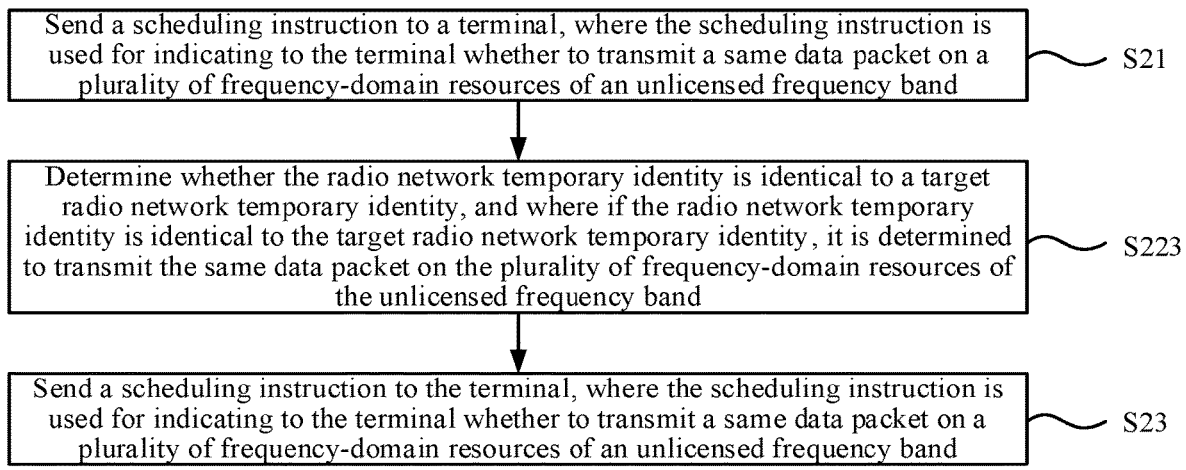
FIG. 12 is still another schematic flow chart showing determining whether to transmit the same data packet on the plurality of frequency-domain resources of the unlicensed frequency band according to the scheduling instruction, according to an embodiment of the present disclosure.

FIG. 12 is still another schematic flow chart showing determining whether to transmit the same data packet on the plurality of frequency-domain resources of the unlicensed frequency band according to the scheduling instruction, according to an embodiment of the present disclosure. As shown in FIG. 12, on the basis of the embodiment shown in FIG. 4, the scheduling instruction includes a radio network temporary identity, and the determining whether to transmit the same data packet on the plurality of frequency-domain resources of the unlicensed frequency band according to the scheduling instruction includes the following step.

In step S223, it is determined whether the radio network temporary identity is identical to a target radio network temporary identity; and
    where if the radio network temporary identity is identical to the target radio network temporary identity, it is determined to transmit the same data packet on the plurality of frequency-domain resources of the unlicensed frequency band.

In one embodiment, in the case that the scheduling instruction is one single scheduling instruction, the scheduling instruction may carry the radio network temporary identity, and the terminal may compare the radio network temporary identity with the target radio network temporary identity. If it is determined that the radio network temporary identity is identical to the target radio network temporary identity, it is determined to transmit the same data packet on the plurality of frequency-domain resources of the unlicensed frequency band.

Figure 13:
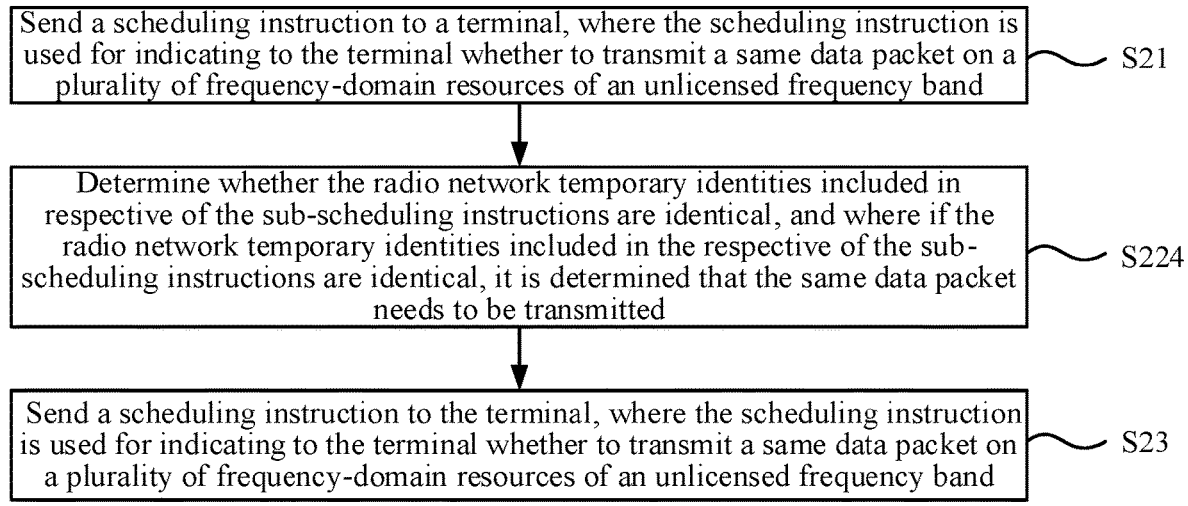
FIG. 13 is still another schematic flow chart showing determining whether to transmit the same data packet on the plurality of frequency-domain resources of the unlicensed frequency band according to the scheduling instruction, according to an embodiment of the present disclosure.

FIG. 13 is still another schematic flow chart showing determining whether to transmit the same data packet on the plurality of frequency-domain resources of the unlicensed frequency band according to the scheduling instruction, according to an embodiment of the present disclosure. As shown in FIG. 13, on the basis of the embodiment shown in FIG. 4, the scheduling instruction includes a plurality of sub-scheduling instructions, where the sub-scheduling instruction includes the radio network temporary identity, and the determining whether to transmit the same data packet on the plurality of frequency-domain resources of the unlicensed frequency band according to the scheduling instruction includes the following step.

In step S224, it is determined whether the radio network temporary identities included in respective of the sub-scheduling instructions are identical; and where if the radio network temporary identities included in the respective of the sub-scheduling instructions are identical, it is determined that the same data packet needs to be transmitted.

In one embodiment, in the case that the scheduling instruction includes the plurality of the sub-scheduling instructions, the sub-scheduling instructions may carry the radio network temporary identity, and the terminal may compare the radio network temporary identities included in the respective of the sub-scheduling instructions. If respective of the radio network temporary identities are identical, it is determined to transmit the same data packet on the plurality of frequency-domain resources of the unlicensed frequency band.

Figure 14:
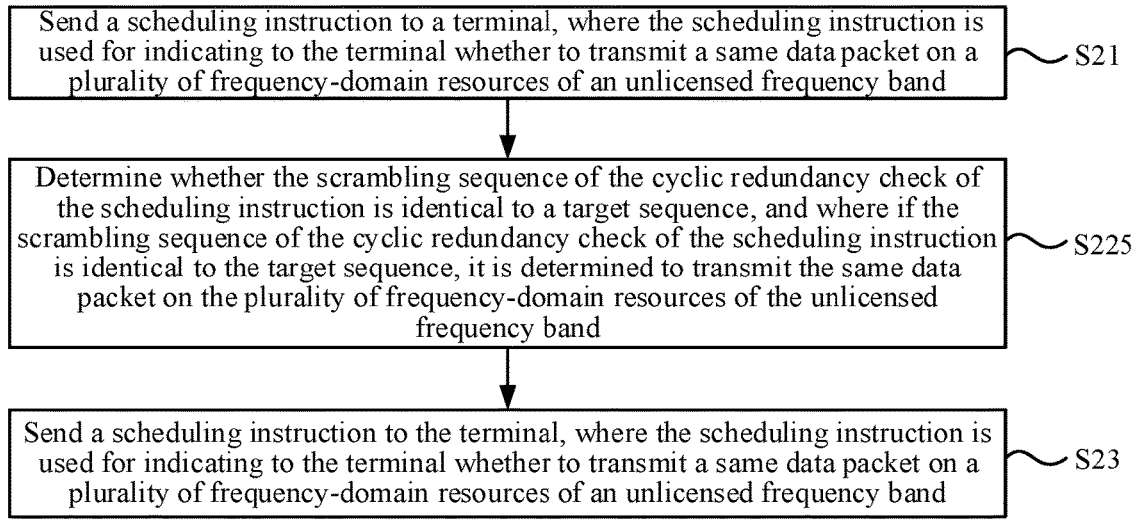
FIG. 14 is still another schematic flow chart showing determining whether to transmit the same data packet on the plurality of frequency-domain resources of the unlicensed frequency band according to the scheduling instruction, according to an embodiment of the present disclosure.

FIG. 14 is still another schematic flow chart showing determining whether to transmit the same data packet on the plurality of frequency-domain resources of the unlicensed frequency band according to the scheduling instruction, according to an embodiment of the present disclosure. As shown in FIG. 14, on the basis of the embodiment shown in FIG. 4, a scrambling sequence of a cyclic redundancy check of the scheduling instruction corresponds to the data packet, and the determining whether to transmit the same data packet on the plurality of frequency-domain resources of the unlicensed frequency band according to the scheduling instruction includes the following step.

In step S225, it is determined whether the scrambling sequence of the cyclic redundancy check of the scheduling instruction is identical to a target sequence; and where if the scrambling sequence of the cyclic redundancy check of the scheduling instruction is identical to the target sequence, it is determined to transmit the same data packet on the plurality of frequency-domain resources of the unlicensed frequency band.

In one embodiment, in the case that the scheduling instruction is one single scheduling instruction, the scheduling instruction may include content scrambled by the scrambling sequence of the cyclic redundancy check, and the terminal may descramble the scrambled content through the target sequence. If successful in descrambling, then it is determined that the scrambling sequence of the cyclic redundancy check is identical to the target sequence, and it is further determined to transmit the same data packet on the plurality of frequency-domain resources of the unlicensed frequency band.

Figure 15:
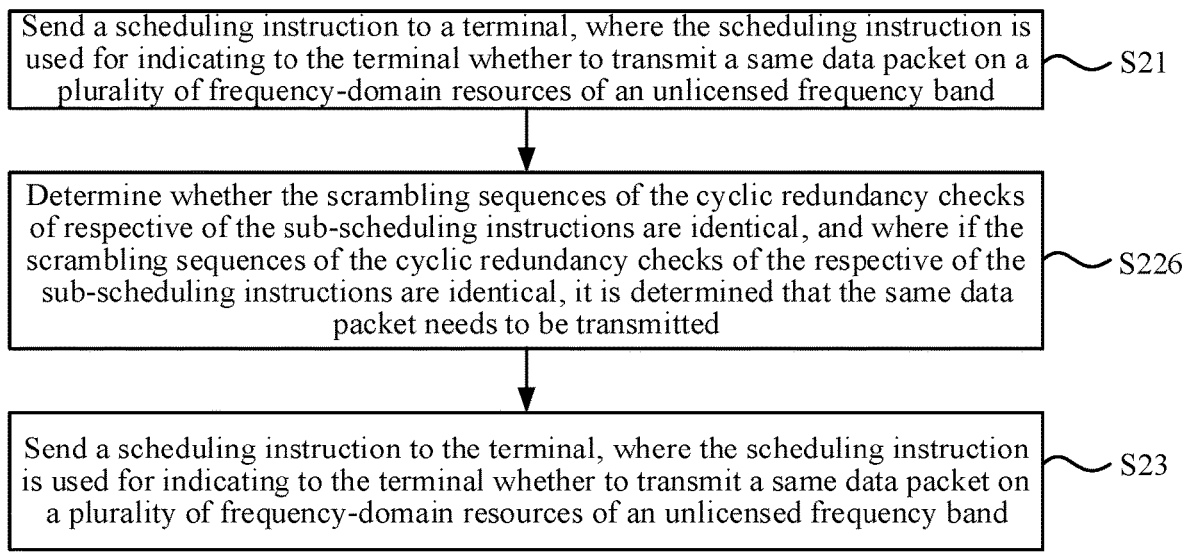
FIG. 15 is still another schematic flow chart showing determining whether to transmit the same data packet on the plurality of frequency-domain resources of the unlicensed frequency band according to the scheduling instruction, according to an embodiment of the present disclosure.

FIG. 15 is still another schematic flow chart showing determining whether to transmit the same data packet on the plurality of frequency-domain resources of the unlicensed frequency band according to the scheduling instruction, according to an embodiment of the present disclosure. As shown in FIG. 15, on the basis of the embodiment shown in FIG. 4, the scheduling instruction includes a plurality of sub-scheduling instructions, and the scrambling sequence of the cyclic redundancy check of the sub-scheduling instruction corresponds to the data packet, and where the determining whether the data packets need to be transmitted are identical according to the plurality of the sub-scheduling instructions includes the following step.

In step S226, it is determined whether the scrambling sequences of the cyclic redundancy checks of respective of the sub-scheduling instructions are identical; and where if the scrambling sequences of the cyclic redundancy checks of the respective of the sub-scheduling instructions are identical, it is determined that the same data packet needs to be transmitted.

In one embodiment, in the case that the scheduling instruction includes the plurality of the sub-scheduling instructions, the respective of the sub-scheduling instruction may include respective of the content scrambled by the scrambling sequence of the cyclic redundancy check, and the terminal may descramble the scrambled content in the respective of the sub-scheduling instruction through the target sequence. If all succeed in descrambling, then it is determined that the scrambling sequences of the cyclic redundancy checks of the respective of the sub-scheduling instructions are identical, and it is further determined to transmit the same data packet on the plurality of frequency-domain resources of the unlicensed frequency band.

Figure 16:
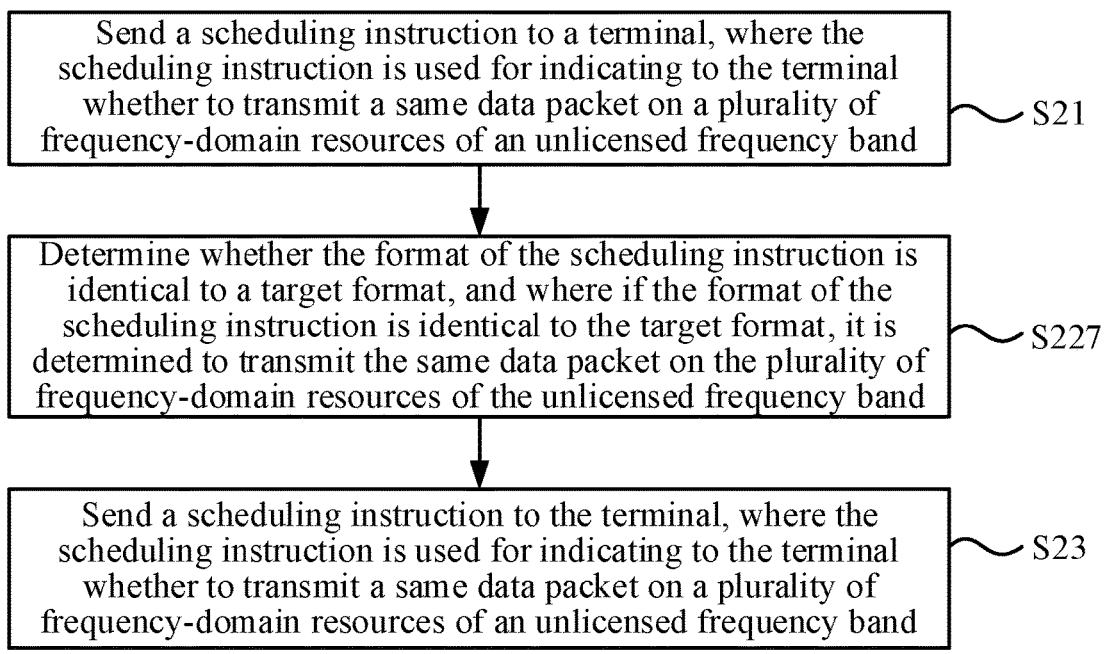
FIG. 16 is still another schematic flow chart showing determining whether to transmit the same data packet on the plurality of frequency-domain resources of the unlicensed frequency band according to the scheduling instruction, according to an embodiment of the present disclosure.

FIG. 16 is still another schematic flow chart showing determining whether to transmit the same data packet on the plurality of frequency-domain resources of the unlicensed frequency band according to the scheduling instruction, according to an embodiment of the present disclosure. As shown in FIG. 16, on the basis of the embodiment shown in FIG. 4, a format of the scheduling instruction corresponds to the data packet, and the determining whether to transmit the same data packet on the plurality of frequency-domain resources of the unlicensed frequency band according to the scheduling instruction includes the following step.

In step S227, it is determined whether the format of the scheduling instruction is identical to a target format; and where if the format of the scheduling instruction is identical to the target format, it is determined to transmit the same data packet on the plurality of frequency-domain resources of the unlicensed frequency band.

In one embodiment, in the case that the scheduling instruction is one single scheduling instruction, the format of the scheduling instruction may correspond to the data packet, and the terminal may compare the format of the scheduling instruction with the target format. If it is determined that the format of the scheduling instruction is identical to the target format, it is determined to transmit the same data packet on the plurality of frequency-domain resources of the unlicensed frequency band.

Figure 17:
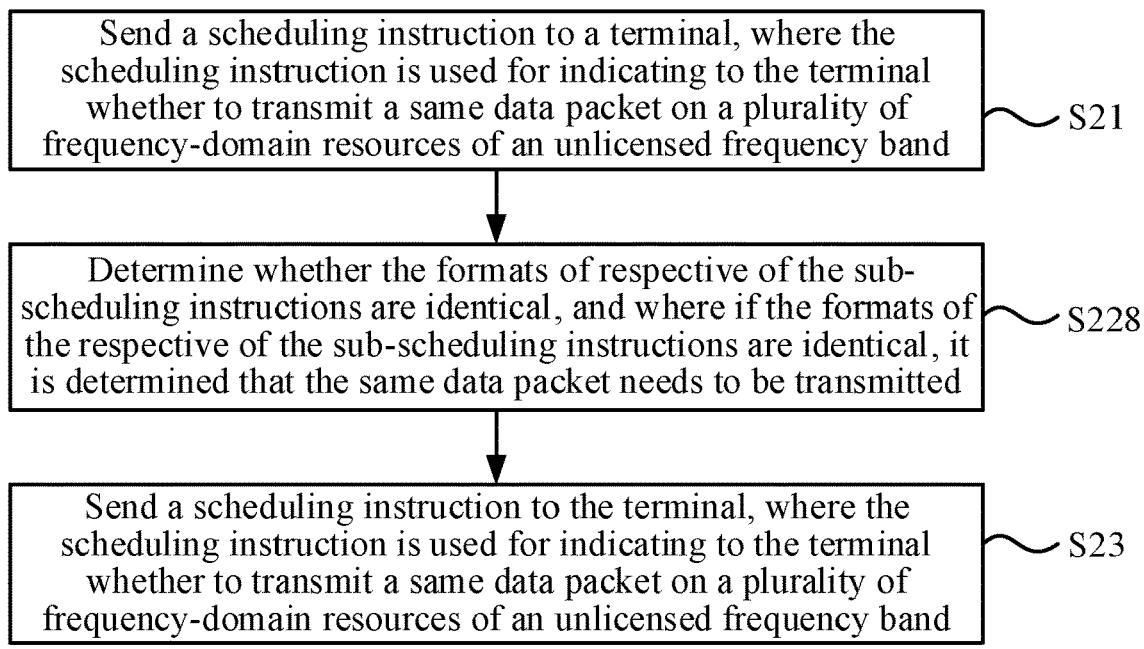
FIG. 17 is still another schematic flow chart showing determining whether to transmit the same data packet on the plurality of frequency-domain resources of the unlicensed frequency band according to the scheduling instruction, according to an embodiment of the present disclosure.

FIG. 17 is still another schematic flow chart showing determining whether to transmit the same data packet on the plurality of frequency-domain resources of the unlicensed frequency band according to the scheduling instruction, according to an embodiment of the present disclosure. As shown in FIG. 17, on the basis of the embodiment shown in FIG. 4, the scheduling instruction includes a plurality of sub-scheduling instructions, and the format of the sub-scheduling instruction corresponds to the data packet, and where determining whether the data packets need to be transmitted are identical according to the plurality of the sub-scheduling instructions includes the following step.

In step S228, it is determined whether the formats of respective of the sub-scheduling instructions are identical; and where if the formats of the respective of the sub-scheduling instructions are identical, it is determined that the same data packet needs to be transmitted.

In one embodiment, in the case that the scheduling instruction includes the plurality of the sub-scheduling instructions, each of the sub-scheduling instructions may have its own format, and the terminal may compare the formats of the plurality of the sub-scheduling instructions. If the formats of the respective of the sub-scheduling instructions are identical, it is determined to transmit the same data packet on the plurality of frequency-domain resources of the unlicensed frequency band.

Optionally, the frequency-domain resource includes at least one of:

a carrier, a bandwidth part in a same carrier and bandwidth parts in different carriers.

Corresponding to the foregoing embodiments of the data scheduling method and the data transmission method, the present disclosure also provides embodiments of a data scheduling apparatus and embodiments of a data transmission apparatus.

Figure 18:
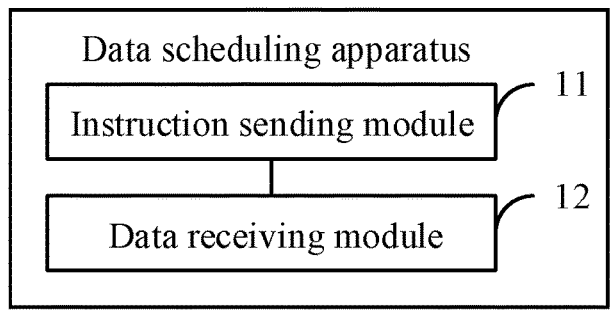
FIG. 18 is a schematic block diagram illustrating an data scheduling apparatus according to an embodiment of the present disclosure.

FIG. 18 is a schematic block diagram illustrating a data scheduling apparatus, according to an embodiment of the present disclosure. The apparatus described by the present embodiment is applicable to a base station, where the base station may communicate with a terminal serving as user equipment, and the terminal includes an electronic device such as a mobile phone, a tablet computer, a wearable device, and the like. The base station and the terminal may communicate based on 5G NR.

As shown in FIG. 18, the data scheduling apparatus may include:

an instruction sending module 11, configured to send a scheduling instruction to a terminal, where the scheduling instruction is used for indicating to the terminal whether to transmit a same data packet on a plurality of frequency-domain resources of an unlicensed frequency band; and a data receiving module 12, configured to receive the data packet transmitted by the terminal on at least one frequency-domain resource among the plurality of frequency-domain resources in the case that the scheduling instruction indicates to the terminal to transmit the same data packet on the plurality of frequency-domain resources.

Optionally, the scheduling instruction includes first identifiers of the plurality of the frequency-domain resources, and the first identifier is used for indicating to the terminal whether to transmit the same data packet on the plurality of frequency-domain resources of the unlicensed frequency band, where the first identifiers are set in different information fields of the scheduling instruction.

Optionally, the scheduling instruction includes the first identifiers of the plurality of the frequency-domain resources, and the first identifier is used for indicating to the terminal whether to transmit the same data packet on the plurality of frequency-domain resources of the unlicensed frequency band, where the first identifier are set in same information domain of the scheduling instruction.

Optionally, the scheduling instruction indicates to the terminal whether to transmit the same data packet on the plurality of frequency-domain resources of the unlicensed frequency band through a radio network temporary identity.

Optionally, the scheduling instruction indicates to the terminal whether to transmit the same data packet on the plurality of frequency-domain resources of the unlicensed frequency band through a scrambling sequence of a cyclic redundancy check.

Optionally, the scheduling instruction indicates to the terminal whether to transmit the same data packet on the plurality of frequency-domain resources of the unlicensed frequency band through a format of the scheduling instruction.

Optionally, the scheduling instruction includes a plurality of sub-scheduling instructions, and each of the sub-scheduling instructions is used for indicating to the terminal whether to transmit the same data packet on a respective of the frequency-domain resource; and where the data receiving module is configured to receive the data packet transmitted by the terminal on at least one frequency-domain resource among the plurality of frequency-domain resources in the case that the respective of the sub-scheduling instruction indicates to the terminal to transmit the same data packet on the respective of the frequency-domain resource.

Optionally, the frequency-domain resource includes at least one of:

a carrier, a Bandwidth Part in a same carrier and Bandwidth Parts in different carriers.

Figure 19:
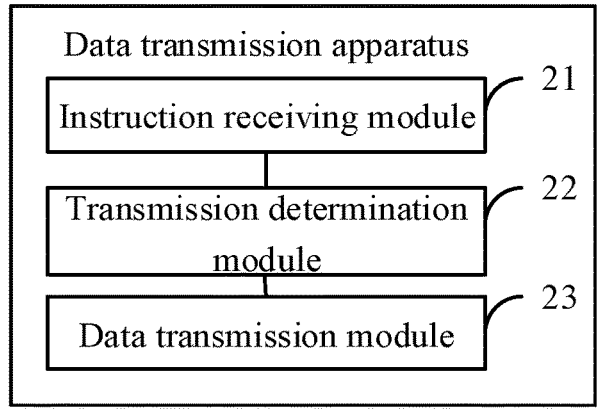
FIG. 19 is a schematic block diagram illustrating a data transmission apparatus, according to an embodiment of the present disclosure.

FIG. 19 is a schematic block diagram illustrating a data transmission apparatus, according to an embodiment of the present disclosure. The apparatus described by the present embodiment is applicable to a terminal, where the terminal may communicate with a base station as user equipment, and the terminal includes an electronic device such as a mobile phone, a tablet computer, a wearable device, and the like. The base station and the terminal may communicate based on 5G NR.

As shown in FIG. 19, the data transmission apparatus may include:

an instruction receiving module 21, configured to receive a scheduling instruction sent by a base station;

a transmission determination module 22, configured to determine whether to transmit a same data packet on a plurality of frequency-domain resources of an unlicensed frequency band according to the scheduling instruction; and a data transmission module 23, configured to transmit the data packet on at least one frequency-domain resource among the plurality of frequency-domain resources in the case that the same data packet is transmitted on the plurality of frequency-domain resources of the unlicensed frequency band.

Figure 20:
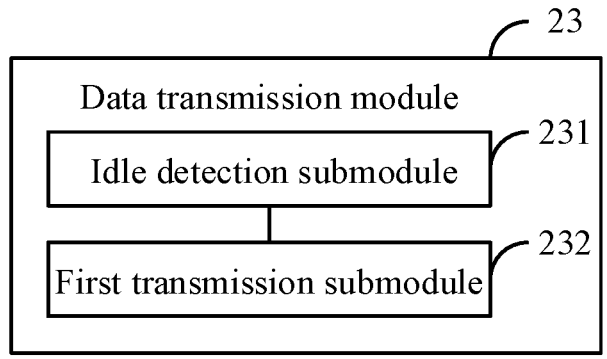
FIG. 20 is a schematic block diagram illustrating a data transmission module, according to an embodiment of the present disclosure.

FIG. 20 is a schematic block diagram illustrating a data transmission module, according to an embodiment of the present disclosure. As shown in FIG. 20, on the basis of the embodiment shown in FIG. 19, the data transmission module 23 includes:

an idle detection submodule 231, configured to detect at least one frequency-domain resource among the plurality of frequency-domain resources to determine idle frequency-domain resources among the plurality of frequency-domain resources; and a first transmission submodule 232, configured to transmit the data packet on at least one of the idle frequency-domain resources.

Figure 21:
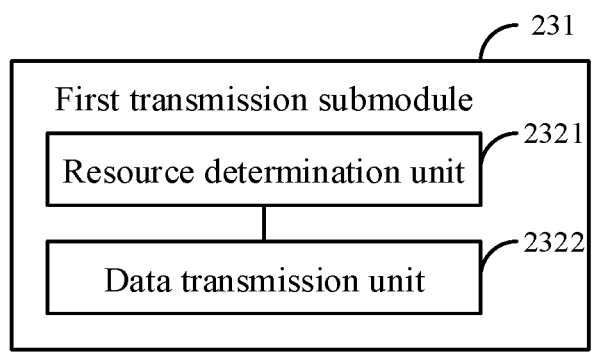
FIG. 21 is a schematic block diagram illustrating a first transmission submodule, according to an embodiment of the present disclosure.

FIG. 21 is a schematic block diagram illustrating a first transmission submodule, according to an embodiment of the present disclosure. As shown in FIG. 21, on the basis of the embodiment shown in FIG. 20, the first transmission submodule 232 includes:

a resource determination unit 2321, configured to determine a starting time-domain resources corresponding to a respective of the frequency-domain resource of the at least one of the idle frequency-domain resources; and a data transmission unit 2322, configured to transmit the data packet on at least one of the idle frequency-domain resources according to a relationship of respective of the starting time-domain resource.

Optionally, the second transmission submodule is configured to transmit the data packet on the idle frequency-domain resource corresponding to an earliest starting time-domain resource.

Figure 22:
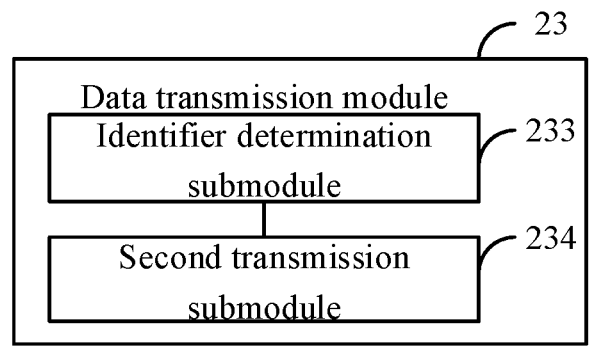
FIG. 22 is a schematic block diagram illustrating another data transmission module, according to an embodiment of the present disclosure.

FIG. 22 is a schematic block diagram illustrating another data transmission module, according to an embodiment of the present disclosure. As shown in FIG. 22, on the basis of the embodiment shown in FIG. 19, the data transmission module 23 includes:
- an identifier determination submodule 233, configured to determine a sequence number corresponding to respective of the frequency-domain resource of the at least one of the idle frequency-domain resources; and
- a second transmission submodule 234, configured to transmit the data packet on at least one of the idle frequency-domain resources according to a relationship of a respective of the sequence number.

Optionally, the third transmission submodule is configured to transmit the data packet on the idle frequency-domain resource corresponding to a sequence number arranged at a preset position.

Optionally, the scheduling instruction includes a first identifier corresponding to the data packet, and the transmission determination module is configured to determine whether the first identifier is identical to a target identifier; and
- where if the first identifier is identical to the target identifier, it is determined to transmit the same data packet on the plurality of frequency-domain resources of the unlicensed frequency band.

Optionally, the scheduling instruction includes a plurality of sub-scheduling instructions, where the sub-scheduling instruction includes the first identifier corresponding to the data packet, and the transmission determination module is configured to determine whether the first identifiers which are included in respective of the sub-scheduling instructions and are corresponding to the data packet are identical; and
- where if the first identifiers which are included in the respective of the sub-scheduling instructions and are corresponding to the data packet are identical, it is determined to transmit the same data packet on the plurality of frequency-domain resources of the unlicensed frequency band.

Optionally, the scheduling instruction includes a radio network temporary identity, and the transmission determination module is configured to,
- determine whether the radio network temporary identity is identical to a target radio network temporary identity; and
- where if the radio network temporary identity is identical to the target radio network temporary identity, it is determined to transmit the same data packet on the plurality of frequency-domain resources of the unlicensed frequency band.

Optionally, the scheduling instruction includes a plurality of sub-scheduling instructions, where the sub-scheduling instructions includes the radio network temporary identity, and the transmission determining module is configured to determine whether the radio network temporary identities included in respective of the sub-scheduling instructions are identical; and
- where if the radio network temporary identities included in the respective of the sub-scheduling instructions are identical, it is determined that the same data packet needs to be transmitted.

Optionally, a scrambling sequence of a cyclic redundancy check of the scheduling instruction corresponds to the data packet, and the transmission determination module is configured to determine whether the scrambling sequence of the cyclic redundancy check of the scheduling instruction is identical to a target sequence; and
- where if the scrambling sequence of the cyclic redundancy check of the scheduling instruction is identical to the target sequence, it is determined to transmit the same data packet on the plurality of frequency-domain resources of the unlicensed frequency band.

Optionally, the scheduling instruction includes a plurality of sub-scheduling instructions, and the scrambling sequence of the cyclic redundancy check of the sub-scheduling instruction corresponds to the data packet, where the transmission determination module is configured to determine whether the scrambling sequences of the redundancy cyclic checks of respective of the sub-scheduling instructions are identical; and
- where if the scrambling sequences of the cyclic redundancy checks of the respective of the sub-scheduling instructions are identical, it is determined that the same data packet needs to be transmitted.

Optionally, a format of the scheduling instruction corresponds to the data packet, and the transmission determining module is configured to determine whether the format of the scheduling instruction is identical to a target format; and
- where if the format of the scheduling instruction is identical to the target format, it is determined to transmit the same data packet on the plurality of frequency-domain resources of the unlicensed frequency band.

Optionally, the scheduling instruction includes a plurality of sub-scheduling instructions, and the format of the sub-scheduling instruction corresponds to the data packet, where the transmission determination module is configured to, determine whether the formats of respective of the sub-scheduling instructions are identical; and
- where if the formats of the respective of the sub-scheduling instructions are identical, it is determined that the same data packet needs to be transmitted.

Optionally, the frequency-domain resource includes at least one of:
- a carrier, a bandwidth part in a same carrier and bandwidth parts in different carriers.

With respect to the apparatus in the above embodiments, the specific manners for performing operations for individual modules therein have been described in detail in the embodiments of the related methods, which will not be elaborated herein.

For the apparatus embodiment, since it generally corresponds to the method embodiment, for the relevant contents, the illustration of the part of the method embodiment may be referred to. The apparatus embodiments described hereinabove is merely schematic. The unit illustrated as a separate component here may or may not be physically separate, and the component displayed as a unit may or may not be a physical unit, i.e. may be located at one place or may be distributed to a plurality of network units. Some or all of the modules may be selected to achieve the objective of the solution of the embodiments according to actual need, which may be understood and implemented by those of ordinary skilled in the art without creative work.

The embodiments of the present disclosure also proposes an electronic device, including:
- a processor;
- a memory for storing instructions executable by the processor;
- wherein the processor is configured to execute the steps in the data scheduling method and/or in the data transmission method described by any of the foregoing embodiments.

The embodiments of the present disclosure also proposes a computer-readable storage medium having stored therein a computer program that, when executed by a processor, implements the steps in the data scheduling method and/or in the data transmission method described by any of the foregoing embodiments is implemented.

Figure 23:
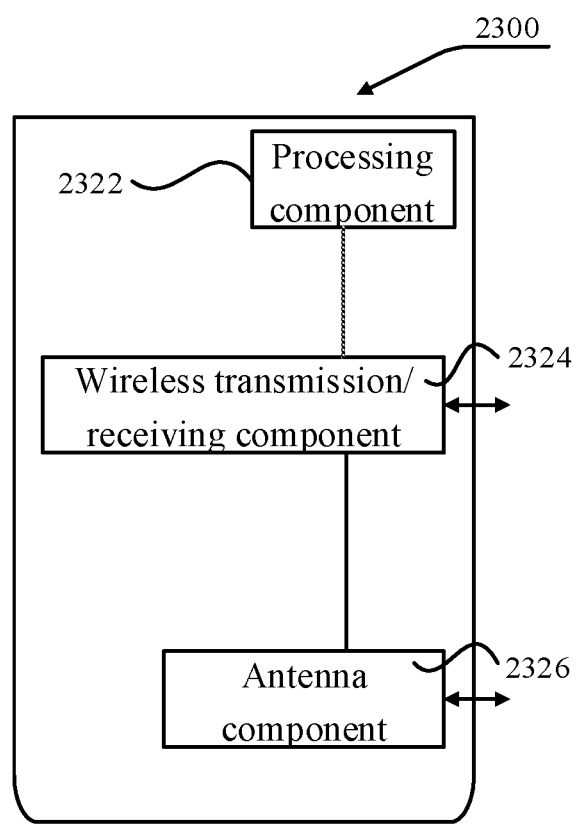
FIG. 23 is a schematic block diagram of a data scheduling apparatus, according to an embodiment of the present disclosure.

As shown in FIG. 23, FIG. 23 is a schematic block diagram of a data scheduling apparatus 2300, according to an embodiment of the present disclosure. The apparatus 2300 may be provided as a base station. Referring to FIG. 23, the apparatus 2300 includes a processing component 2322, a wireless transmission/receiving component 2324, an antenna component 2326 and a signal processing part specific to a wireless interface, and the processing component 2322 may further include one or more processors. One of the processors in the processing component 2322 may be configured to execute the steps in the data scheduling method described by any of the foregoing embodiments.

Figure 24:
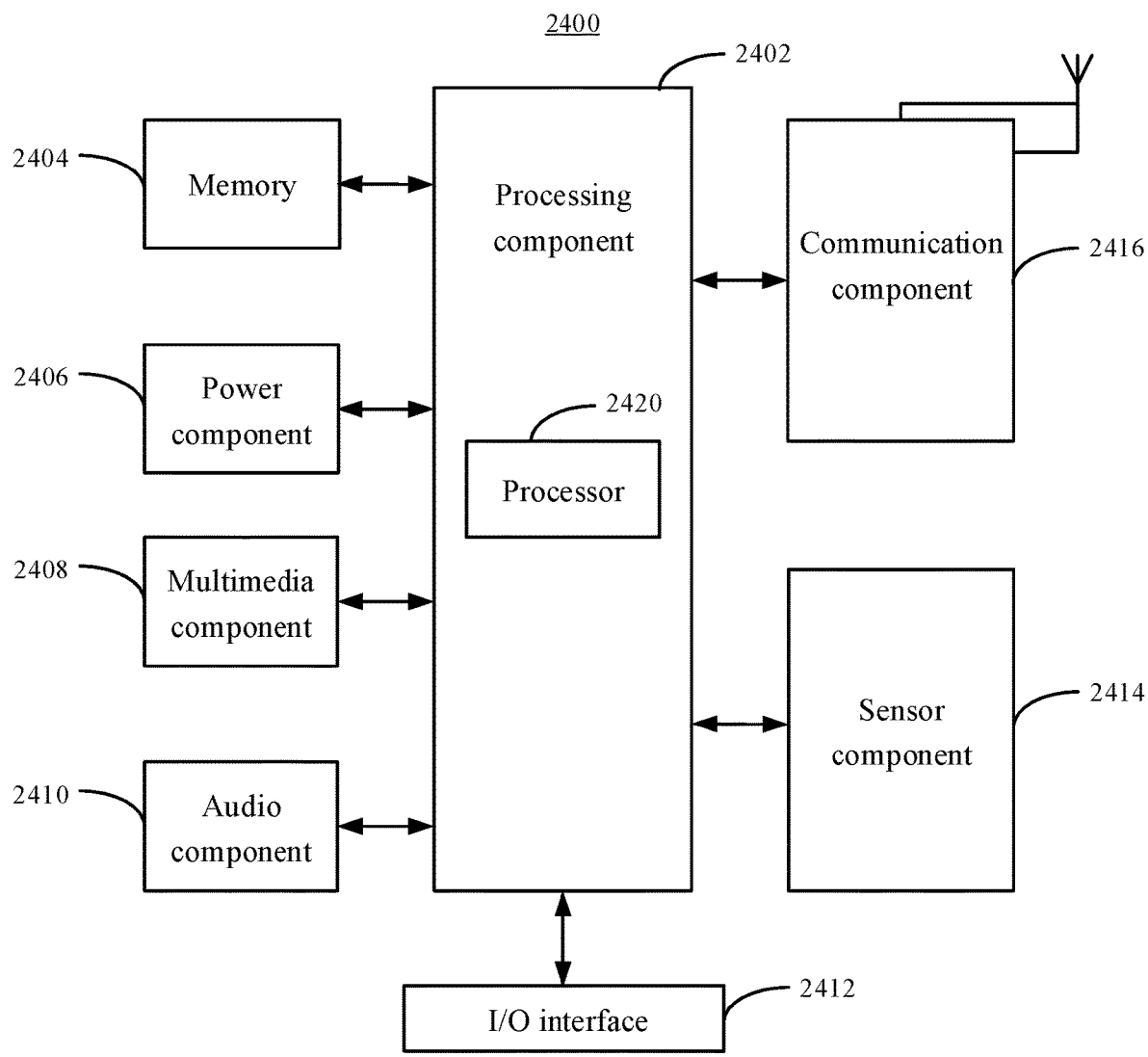
FIG. 24 is a schematic block diagram of a data transmission apparatus, according to an embodiment of the present disclosure.

FIG. 24 is a schematic block diagram of a data transmission apparatus 2400, according to an embodiment of the present disclosure. For example, the apparatus 2400 may be a mobile phone, a computer, a digital broadcasting terminal, a messaging device, a gaming console, a tablet, a medical device, exercise equipment, a personal digital assistant and the like.

Referring to FIG. 24, the apparatus 2400 may include one or more of the following components: a processing component 2402, a memory 2404, a power component 2406, a multimedia component 2408, an audio component 2410, an input/output (I/O) interface 2412, a sensor component 2414 and a communication component 2416.

The processing component 2402 typically controls overall operations of the apparatus 2400, such as the operations associated with display, telephone calls, data communications, camera operations and recording operations. The processing component 2402 may include one or more processors 2420 to execute instructions to perform all or part of the steps in the above described methods. Moreover, the processing component 2402 may include one or more modules which facilitate the interaction between the processing component 2402 and other components. For instance, the processing component 2402 may include a multimedia module to facilitate the interaction between the multimedia component 2408 and the processing component 2402.

The memory 2404 is configured to store various types of data to support the operation of the apparatus 2400. Examples of such data include instructions for any applications or methods operated on the apparatus 2400, contact data, phonebook data, messages, pictures, video, etc. The memory 2404 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or an optical disk.

The power component 2406 provides power to various components of the apparatus 2400. The power component 2406 may include a power management system, one or more power sources, and any other components associated with the generation, management, and distribution of power in the apparatus 2400.

The multimedia component 2408 includes a screen providing an output interface between the apparatus 2400 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 2408 includes a front camera and/or a rear camera. The front camera and the rear camera may receive an external multimedia datum while the apparatus 2400 is in an operation mode, such as a photographing mode or a video mode. Each of the front camera and the rear camera may be a fixed optical lens system or have focus and optical zoom capability.

The audio component 2410 is configured to output and/or input audio signals. For example, the audio component 2410 includes a microphone ("MIC") configured to receive an external audio signal when the apparatus 2400 is in an operation mode, such as a call mode, a recording mode, and a voice recognition mode. The received audio signal may be further stored in the memory 2404 or transmitted via the communication component 2416. In some embodiments, the audio component 2410 further includes a speaker to output audio signals.

The I/O interface 2412 provides an interface between the processing component 2402 and peripheral interface modules, such as a keyboard, a click wheel, buttons, and the like. The buttons may include, but are not limited to, a home button, a volume button, a starting button, and a locking button.

The sensor component 2414 includes one or more sensors to provide status assessments of various aspects of the apparatus 2400. For instance, the sensor component 2414 may detect an open/closed status of the apparatus 2400, relative positioning of components, e.g., the display and the keypad, of the apparatus 2400, a change in position of the apparatus 2400 or a component of the apparatus 2400, a presence or absence of user contact with the apparatus 2400, an orientation or an acceleration/deceleration of the apparatus 2400, and a change in temperature of the apparatus 2400. The sensor component 2414 may include a proximity sensor configured to detect the presence of nearby objects without any physical contact. The sensor component 2414 may also include a light sensor, such as a CMOS or CCD image sensor, for use in imaging applications. In some embodiments, the sensor component 2414 may also include an accelerometer sensor, a gyroscope sensor, a magnetic sensor, a pressure sensor, or a temperature sensor.

The communication component 2416 is configured to facilitate communication, wired or wirelessly, between the apparatus 2400 and other devices. The apparatus 2400 may access a wireless network based on a communication standard, such as WiFi, 2G, or 3G, or a combination thereof. In one exemplary embodiment, the communication component 2416 receives a broadcast signal or broadcast associated information from an external broadcast management system via a broadcast channel. In one exemplary embodiment, the communication component 2416 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the apparatus 2400 may be implemented with one or more application specific integrated circuits (ASICs), digital signal processors (DSPs), digital signal processing devices (DSPDs), programmable logic devices (PLDs), field programmable gate arrays (FP- GAs), controllers, micro-controllers, microprocessors, or other electronic components, for performing a step in the data transmission method described by any of the foregoing embodiments.

In exemplary embodiments, there is also provided a non-transitory computer-readable storage medium including instructions, such as included in the memory 2404, executable by the processor 2420 in the apparatus 2400, for performing the above-described methods. For example, the non-transitory computer-readable storage medium may be a ROM, a random access memory (RAM), a CD-ROM, a magnetic tape, a floppy disc, an optical data storage device, and the like.

Other embodiments of the present disclosure will be apparent to those skilled in the art from consideration of the specification and practice of the disclosure disclosed here. The present disclosure is intended to cover any variations, uses, or adaptations of the present disclosure following the general principles thereof and including such departures from the present disclosure as come within known or customary practice in the art. It is intended that the specification and embodiments be considered as exemplary only, with a true scope and spirit of the present disclosure being indicated by the following claims.

It will be appreciated that the present invention is not limited to the exact construction that has been described above and illustrated in the accompanying drawings, and that various modifications and changes can be made without departing from the scope thereof. It is intended that the scope of the present disclosure only be limited by the appended claims.

It needs to be illustrated that the relational term, such as first, second, and the like, are merely used to distinguish one entity or operation from another entity or operation, which does not necessarily require or imply any such actual relationship or order existing among these entities or operations herein. The terms "include", "comprise" or any other variants thereof are intended to cover non-exclusive inclusion, and thus it is caused that a process, a method, an article or a device including a series of elements includes not only those elements, but also other elements which are not explicitly specified, or includes elements inherent to the process, the method, the article or device. Without more restrictions, the element defined by the sentence "including a . . . " does not exclude the existence of an additional same element in the process, the method, the article or the device including the element.

The methods and the apparatuses provided by the embodiments of the present disclosure are described above in detail. Specific examples are used to set forth the principle and the manner of implementation of the present disclosure herein. The foregoing description of the embodiments is merely used to help understanding the method and core idea of the present disclosure. At the same time, for those of ordinary skilled in the art, according to the idea of the present disclosure, there will be changes in specific manner of implementation and the scope of application. In conclusion, the content of the present specification should not be construed as a limit on the present disclosure.

What is claimed is:

1. A data scheduling method, being applicable to a base station, wherein the method comprises:
   sending a scheduling instruction to a terminal, wherein the scheduling instruction is used for indicating to the terminal whether to transmit a same data packet on a plurality of frequency-domain resources of an unlicensed frequency band; and
   when the scheduling instruction indicates to the terminal to transmit the same data packet on the plurality of frequency-domain resources, receiving the same data packet transmitted by the terminal on at least one frequency-domain resource among the plurality of frequency-domain resources, wherein receiving the same data packet transmitted by the terminal on at least one frequency-domain resource among the plurality of frequency-domain resources comprises:
   detecting at least one frequency-domain resource among the plurality of frequency-domain resources;
   determining idle frequency-domain resources among the at least one frequency-domain resource detected; and
   receiving the same data packet on at least one of the idle frequency-domain resources,
   wherein the receiving the same data packet on the at least one of the idle frequency-domain resources comprises:
   selecting one or more idle frequency-domain resources among the idle frequency-domain resources based on a preset parameter to transmit the same data packet,
   wherein the preset parameter is a number of times the frequency-domain resource has been used by the terminal, and the selecting one or more idle frequency-domain resources among the idle frequency-domain resources based on a preset parameter comprises: selecting the frequency-domain resource that has been used and has been used for a highest number of times.

2. The method of claim 1, wherein
   the scheduling instruction comprises first identifiers of the plurality of frequency-domain resources, and the first identifiers are used for indicating to the terminal whether to transmit the same data packet on the plurality of frequency-domain resources of the unlicensed frequency band, wherein the first identifiers are set in different information fields of the scheduling instruction, or
   wherein the scheduling instruction comprises first identifiers of the plurality of frequency-domain resources, and the first identifiers are used for indicating to the terminal whether to transmit the same data packet on the plurality of frequency-domain resources of the unlicensed frequency band, wherein the first identifiers are set in a same information field of the scheduling instruction.

3. The method of claim 1, wherein
   the scheduling instruction indicates to the terminal whether to transmit the same data packet on the plurality of frequency-domain resources of the unlicensed frequency band through a radio network temporary identity, or
   wherein the scheduling instruction indicates to the terminal whether to transmit the same data packet on the plurality of frequency-domain resources of the unlicensed frequency band through a scrambling sequence of a cyclic redundancy check.

4. The method of claim 1, wherein the scheduling instruction indicates to the terminal whether to transmit the same data packet on the plurality of frequency-domain resources of the unlicensed frequency band through a format of the scheduling instruction.

5. The method of claim 1, wherein
   the scheduling instruction comprises a plurality of sub-scheduling instructions, and each of the sub-scheduling instructions is used for indicating to the terminal whether to transmit the same data packet on each of the frequency-domain resources; and wherein when each of the sub-scheduling instructions indicates to the terminal to transmit the same data packet on each of the frequency-domain resources, the same data packet transmitted by the terminal on at least one frequency-domain resource among the plurality of frequency-domain resources is received.

6. A data transmission method, being applicable to a terminal, wherein the method comprises:
receiving a scheduling instruction sent by a base station;
determining whether to transmit a same data packet on a plurality of frequency-domain resources of an unlicensed frequency band according to the scheduling instruction; and
when transmitting the same data packet on the plurality of frequency-domain resources of the unlicensed frequency band, transmitting the same data packet on at least one frequency-domain resource among the plurality of frequency-domain resources,
wherein the transmitting the same data packet on the at least one frequency-domain resource among the plurality of frequency-domain resources comprises:
detecting at least one frequency-domain resource among the plurality of frequency-domain resources;
determining idle frequency-domain resources among the at least one frequency-domain resource detected; and
transmitting the same data packet on at least one of the idle frequency-domain resources,
wherein the transmitting the same data packet on the at least one of the idle frequency-domain resources comprises:
selecting one or more idle frequency-domain resources among the idle frequency-domain resources based on a preset parameter to transmit the same data packet,
wherein the preset parameter is a number of times the frequency-domain resource has been used by the terminal, and the selecting one or more idle frequency-domain resources among the idle frequency-domain resources based on a preset parameter comprises:
selecting the frequency-domain resource that has been used and has been used for a highest number of times.

7. The method of claim 6, wherein the transmitting the same data packet on the at least one of the idle frequency-domain resources comprises:
determining a starting time-domain resource corresponding to a respective frequency-domain resource of the at least one of the idle frequency-domain resources; and
transmitting the same data packet on the at least one of the idle frequency-domain resources which is determined according to a relationship of respective of the starting time-domain resource.

8. The method of claim 7, wherein the transmitting the same data packet on the at least one of the idle frequency-domain resources according to the relationship of respective of the starting time-domain resource comprises:
transmitting the same data packet on the idle frequency-domain resource corresponding to an earliest starting time-domain resource.

9. The method of claim 6, wherein the transmitting the same data packet on the at least one of the idle frequency-domain resources comprises:
determining a sequence number corresponding to a respective frequency-domain resource of the at least one of the idle frequency-domain resources; and
transmitting the same data packet on the at least one of the idle frequency-domain resources which is determined according to a relationship of respective of the sequence number.

10. The method of claim 9, wherein the transmitting the same data packet on the at least one of the idle frequency-domain resources according to the relationship of respective of the sequence number comprises:
transmitting the same data packet on the idle frequency-domain resource corresponding to a sequence number arranged at a preset position.

11. The method of claim 6, wherein
the scheduling instruction comprises a first identifier corresponding to the same data packet, and
the determining whether to transmit the same data packet on the plurality of frequency-domain resources of the unlicensed frequency band according to the scheduling instruction comprises:
determining whether the first identifier is identical to a target identifier; and
wherein when the first identifier is identical to the target identifier, it is determined to transmit the same data packet on the plurality of frequency-domain resources of the unlicensed frequency band.

12. The method of claim 6, wherein
the scheduling instruction comprises a plurality of sub-scheduling instructions, wherein each sub-scheduling instruction comprises a first identifier corresponding to the same data packet, and
the determining whether to transmit the same data packet on the plurality of frequency-domain resources of the unlicensed frequency band according to the scheduling instruction comprises:
determining whether first identifiers which are comprised in the plurality of the sub-scheduling instructions are identical; and
wherein when the first identifiers which are comprised in the plurality of the sub-scheduling instructions are identical, it is determined to transmit the same data packet on the plurality of frequency-domain resources of the unlicensed frequency band.

13. The method of claim 6, wherein
the scheduling instruction comprises a radio network temporary identity, and
the determining whether to transmit the same data packet on the plurality of frequency-domain resources of the unlicensed frequency band according to the scheduling instruction comprises:
determining whether the radio network temporary identity is identical to a target radio network temporary identity; and
wherein when the radio network temporary identity is identical to the target radio network temporary identity, it is determined to transmit the same data packet on the plurality of frequency-domain resources of the unlicensed frequency band.

14. The method of claim 6, wherein
the scheduling instruction comprises a plurality of sub-scheduling instructions,
wherein the sub-scheduling instruction comprises a radio network temporary identity, and
the determining whether to transmit the same data packet on the plurality of frequency-domain resources of the unlicensed frequency band according to the scheduling instruction comprises:
determining whether the radio network temporary identities comprised in respective of the sub-scheduling instructions are identical; and
wherein when the radio network temporary identities comprised in the respective of the sub-scheduling instructions are identical, it is determined that the same data packet needs to be transmitted.

15. The method of claim 6, wherein a scrambling sequence of a cyclic redundancy check of the scheduling instruction corresponds to the data, and the determining whether to transmit the same data packet on the plurality of frequency-domain resources of the unlicensed frequency band according to the scheduling instruction comprises:

determining whether the scrambling sequence of the cyclic redundancy check of the scheduling instruction is identical to a target sequence; and wherein when the scrambling sequence of the cyclic redundancy check of the scheduling instruction is identical to the target sequence, it is determined to transmit the same data packet on the plurality of frequency-domain resources of the unlicensed frequency band.

16. The method of claim 6, wherein the scheduling instruction comprises a plurality of sub-scheduling instructions, and a scrambling sequence of a cyclic redundancy check of the sub-scheduling instruction corresponds to the data, wherein the determining whether data packets need to be transmitted are identical according to the plurality of the sub-scheduling instructions comprises:

determining whether the scrambling sequences of the cyclic redundancy checks of respective of the sub-scheduling instructions are identical; and wherein when the scrambling sequences of the cyclic redundancy checks of the respective of the sub-scheduling instructions are identical, it is determined that the same data packet needs to be transmitted.

17. The method of claim 6, wherein a format of the scheduling instruction corresponds to the data, and the determining whether to transmit the same data packet on the plurality of frequency-domain resources of the unlicensed frequency band according to the scheduling instruction comprises:

determining whether the format of the scheduling instruction is identical to a target format; and wherein when the format of the scheduling instruction is identical to the target format, it is determined to transmit the same data packet on the plurality of frequency-domain resources of the unlicensed frequency band.

18. The method of claim 6, wherein the scheduling instruction comprises a plurality of sub-scheduling instructions, and a format of the sub-scheduling instruction corresponds to the data, wherein the determining whether data packets need to be transmitted are identical according to the plurality of the sub-scheduling instructions comprises:

determining whether the formats of respective of the sub-scheduling instructions are identical; and wherein when the formats of the respective of the sub-scheduling instructions are identical, it is determined that the same data packet needs to be transmitted.

19. A communication system implementing the method of claim 1, comprising the base station and the terminal, wherein the terminal is configured to determine suitable frequency-domain resources for transmitting the same data packet by:

receiving the scheduling instruction sent by a base station;

determining whether to transmit the same data packet on the plurality of frequency-domain resources of the unlicensed frequency band according to the scheduling instruction; and when transmitting the same data packet on the plurality of frequency-domain resources of the unlicensed frequency band, transmitting the same data packet on the at least one frequency-domain resource among the plurality of frequency-domain resources;

thereby ensuring that the transmitted data packet is received by the base station and ensuring successful communication between the base station and the terminal.

\* \* \* \* \*